(12) United States Patent
Lee et al.

(10) Patent No.: US 11,726,645 B2
(45) Date of Patent: *Aug. 15, 2023

(54) DISPLAY APPARATUS FOR CLASSIFYING AND SEARCHING CONTENT, AND METHOD THEREOF

(71) Applicant: SAMSUNG ELECTRONICS CO., LTD., Suwon-si (KR)

(72) Inventors: Jin-ha Lee, Seoul (KR); Ben Cerveny, Los Angeles, CA (US); Gabriel Dunne, San Francisco, CA (US)

(73) Assignee: SAMSUNG ELECTRONIC CO., LTD., Suwon-si (KR)

( * ) Notice: Subject to any disclaimer, the term of this patent is extended or adjusted under 35 U.S.C. 154(b) by 59 days.

This patent is subject to a terminal disclaimer.

(21) Appl. No.: 17/535,352

(22) Filed: Nov. 24, 2021

(65) Prior Publication Data
US 2022/0083210 A1    Mar. 17, 2022

Related U.S. Application Data

(63) Continuation of application No. 16/926,146, filed on Jul. 10, 2020, now Pat. No. 11,188,208, which is a
(Continued)

(30) Foreign Application Priority Data

May 28, 2014    (KR) .......................... 10-2014-0064243

(51) Int. Cl.
*G06F 3/04845*        (2022.01)
*G06F 3/04847*        (2022.01)
(Continued)

(52) U.S. Cl.
CPC ...... *G06F 3/04845* (2013.01); *G06F 3/04842* (2013.01); *G06F 3/04847* (2013.01); *H04N 21/4312* (2013.01); *H04N 21/4858* (2013.01)

(58) Field of Classification Search
CPC ............... G06F 3/0482; G06F 3/04845; G06F 3/04842; G06F 3/04847; H04N 21/4312; H04N 21/4858
See application file for complete search history.

(56) References Cited

U.S. PATENT DOCUMENTS 5,761,655 A    6/1998  Hoffman
7,366,994 B2   4/2008  Loui
(Continued)

FOREIGN PATENT DOCUMENTS

EP    2407869 A1    1/2012
JP    8-149384 A    6/1996
(Continued)

OTHER PUBLICATIONS

Communication dated Apr. 20, 2020 from the Indian Patent Office in application No. 201647044132.
(Continued)

*Primary Examiner* — Nicholas Klicos
(74) *Attorney, Agent, or Firm* — Sughrue Mion, PLLC

(57) ABSTRACT

A display apparatus and a display method thereof are provided. According to an exemplary embodiment, a display method of a display apparatus includes: displaying a plurality of display items corresponding to a plurality of content items comprising a first display item displayed in a first region and remaining display items; displaying the first display item using a first display scheme and displaying the remaining display items using a second display scheme; and in response to sensing a user interaction for moving the display items, changing the display scheme of the first display item while moving the first display item in a direction corresponding to the user interaction, displaying the first display item using the second display scheme and changing the display scheme of second display items of the
(Continued)

removing to the first region among the rest display items to the first display scheme.

23 Claims, 45 Drawing Sheets

Related U.S. Application Data continuation of application No. 14/723,598, filed on May 28, 2015, now Pat. No. 10,739,966.

(51) Int. Cl.
*G06F 3/04842* (2022.01)
*H04N 21/431* (2011.01)
*H04N 21/485* (2011.01)

(56) References Cited

U.S. PATENT DOCUMENTS

| | | | |
|---|---|---|---|
| 7,836,475 | B2 | 11/2010 | Angiolillo et al. |
| 8,321,783 | B2 | 11/2012 | Dupuis-Latour et al. |
| 8,555,165 | B2 | 10/2013 | Hunleth et al. |
| 8,564,543 | B2 | 10/2013 | Chaudhrl |
| 8,640,042 | B2 | 1/2014 | McIntyre et al. |
| 9,972,279 | B2 | 5/2018 | Shin et al. |
| 2002/0171690 | A1 | 11/2002 | Fox et al. |
| 2003/0117430 | A1 | 6/2003 | Reynolds et al. |
| 2004/0128317 | A1 | 7/2004 | Sull et al. |
| 2005/0010955 | A1 | 1/2005 | Elia et al. |
| 2005/0192924 | A1 | 9/2005 | Drucker et al. |
| 2005/0246732 | A1 | 11/2005 | Dudkiewicz et al. |
| 2006/0064716 | A1 | 3/2006 | Sull et al. |
| 2006/0107289 | A1 | 5/2006 | DeYonket et al. |
| 2006/0268100 | A1 | 11/2006 | Kraukka et al. |
| 2006/0271867 | A1 | 11/2006 | Wang et al. |
| 2007/0028269 | A1 | 2/2007 | Nezu et al. |
| 2008/0062141 | A1 | 3/2008 | Chandhri |
| 2008/0298697 | A1 | 12/2008 | Lee |
| 2008/0309596 | A1 | 12/2008 | Matsui et al. |
| 2009/0164944 | A1 | 6/2009 | Webster et al. |
| 2009/0174653 | A1 | 7/2009 | Shin et al. |
| 2009/0193465 | A1 | 7/2009 | Yi |
| 2009/0204929 | A1 | 8/2009 | Baurmann et al. |
| 2009/0237367 | A1 | 9/2009 | Ryu et al. |
| 2009/0327969 | A1 | 12/2009 | Estrada |
| 2010/0141851 | A1 | 6/2010 | Kendall |
| 2010/0259562 | A1 | 10/2010 | Miyazawa et al. |
| 2010/0306798 | A1 | 12/2010 | Ahn et al. |
| 2011/0043696 | A1 | 2/2011 | Onogi et al. |
| 2011/0047513 | A1 | 2/2011 | Onogi et al. |
| 2011/0074824 | A1* | 3/2011 | Srinivasan ............... G09G 5/00 345/660 |
| 2011/0115728 | A1 | 5/2011 | Kwak et al. |
| 2011/0179368 | A1 | 7/2011 | King et al. |
| 2011/0321095 | A1 | 12/2011 | Yao et al. |
| 2012/0054684 | A1 | 3/2012 | Gossweiler, III et al. |
| 2012/0098928 | A1 | 4/2012 | Yun et al. |
| 2012/0249832 | A1 | 10/2012 | Okamoto et al. |
| 2012/0268409 | A1 | 10/2012 | Soo et al. |
| 2012/0299812 | A1 | 11/2012 | Park |
| 2013/0047079 | A1* | 2/2013 | Kroeger ............... G06F 3/0485 715/273 |
| 2013/0091465 | A1 | 4/2013 | Kikin-Gil et al. |
| 2013/0268894 | A1 | 10/2013 | Jeon et al. |
| 2013/0276030 | A1 | 10/2013 | Fujimoto |
| 2013/0332378 | A1 | 12/2013 | Brown et al. |
| 2013/0332836 | A1 | 12/2013 | Cho |
| 2014/0049692 | A1 | 2/2014 | Sirpal et al. |
| 2014/0053110 | A1 | 2/2014 | Brown et al. |
| 2014/0068475 | A1 | 3/2014 | Li et al. |
| 2014/0109012 | A1 | 4/2014 | Choudhary et al. |
| 2014/0366061 | A1 | 12/2014 | Kim et al. |
| 2015/0033263 | A1 | 1/2015 | Hiyoshi et al. |
| 2015/0070283 | A1 | 3/2015 | Irwin |
| 2015/0160801 | A1 | 6/2015 | Holt |
| 2016/0313807 | A1 | 10/2016 | Shin et al. |

FOREIGN PATENT DOCUMENTS

| | | |
|---|---|---|
| KR | 1020090076173 A | 7/2009 |
| WO | 2013/136568 A1 | 9/2013 |

OTHER PUBLICATIONS

Communication dated Feb. 19, 2021, from the European Patent Office in European Application No. 20211774.3.

Communication dated Jan. 22, 2019, issued by the European Patent Office in counterpart European Application No. 15 168 011.3.

Communication dated May 12, 2020 from the Korean Patent Office in application No. 10-2014-0064243.

Communication dated Nov. 28, 2019, from the European Patent Office in counterpart European Application No. 15168011.3.

Communication dated Oct. 31, 2017, issued by The State Intellectual Property Office of P.R. China in counterpart application No. 201510282939.6.

Communication dated Oct. 8, 2021 issued by the Indian Patent Office in counterpart Indian Application No. 202048030976.

Communication issued Dec. 15, 2015, issued by the European Patent Office in counterpart European Patent Application No. 15168011.3.

Search Report dated Jun. 18, 2015, issued by the International Searching Authority in counterpart International Patent Application No. PCT/KR2015/003568.

Written Opinion dated Jun. 18, 2015, issued by the International Searching Authority in counterpart International Patent Application No. PCT/KR2015/003568.

\* cited by examiner

DISPLAY APPARATUS FOR CLASSIFYING AND SEARCHING CONTENT, AND METHOD THEREOF

CROSS-REFERENCE TO RELATED APPLICATIONS

This application is a Continuation of U.S. application Ser. No. 16/926,146, filed Jul. 10, 2020, which is a Continuation of U.S. application Ser. No. 14/723,598, filed May 28, 2015, now U.S. Pat. No. 10,739,966 issued Aug. 11, 2020, which claims priority from Korean Patent Application No. 10-2014-0064243, filed on May 28, 2014, in the Korean Intellectual Property Office, the disclosures of which are incorporated herein by reference in their entireties.

BACKGROUND

Field

Apparatuses and methods consistent with exemplary embodiments relate to a display apparatus and a display method thereof, and more particularly, to a display apparatus capable of displaying a graphical user interface (GUI) and a display method thereof which may allow the display apparatus to classify and easily search for a plurality of contents depending on a category.

Description of Related Art

A display apparatus used as a means of simply displaying broadcast contents may also interact with various peripheral apparatuses by connection, and may display various contents provided through an Internet connection. Further, a display apparatus such as a TV has evolved to a smart TV in which various applications are installed.

As the quantity of content, which may be used in the display apparatus, such as content provided from the display apparatus itself and content received from an external server has increased, the importance of a user interface which may easily find and classify content that a user wishes to use has emerged. That is, as the quantity of content which may be used in the display apparatus has increased, the display apparatus may not be easily controlled by the existing remote controller including channel and volume buttons, and the like. Therefore, a need exists for a method to enable a user to easily use and manage content, services, or the like which are provided from a display apparatus with a simple operation.

SUMMARY

Exemplary embodiments of the present disclosure overcome the above disadvantages and other disadvantages not described above. Also, the present disclosure is not required to overcome the disadvantages described above, and an exemplary embodiment may not overcome any of the problems described above.

The present disclosure provides a display apparatus and a display method thereof capable of easily classifying and searching content or services provided from the display apparatus depending on user interaction.

According to an aspect of an exemplary embodiment, a display method of a display apparatus includes: displaying a plurality of display items corresponding to a plurality of content items, the plurality of display items comprising a first display item displayed in a first region and remaining display items; displaying the first display item using a first display scheme and displaying the remaining display items using a second display scheme; and in response to sensing a user interaction for changing a focus, changing the display scheme of the first display item while moving the first display item in a direction corresponding to the user interaction, displaying the first display item using the second display scheme and changing the display scheme of second display items moving to the first region to the first display scheme.

The first display scheme may be a scheme of displaying thumbnail images corresponding to the first display item in a block form having a first thumbnail width, and the second display scheme may be a scheme of displaying thumbnail images corresponding to the second display items in a block form having a second thumbnail width narrower than the first thumbnail width.

The second display scheme may be a scheme of displaying thumbnail images in a block form having a color corresponding to an average value of pixel values included in thumbnail images displayed in the second display scheme.

In the changing, a width of the first display item may be reduced in a first direction and a width of the second display item moving to the first region may be increased in the first direction, in a manner corresponding to the user interaction to change the display scheme of the second display item to the first display scheme.

In the changing, in response to the width of the second display item moving to the first region being wider than that of the first display item, the display scheme of the first display item may be changed to the second display scheme and the display scheme of the second display item moving to the first region may be changed to the first display scheme.

The display method may further include displaying the first display item using a third display scheme and changing the display scheme of the remaining display items to the first display scheme in response to sensing a second user interaction for extending the plurality of display items.

The third display scheme may be a scheme of displaying a pre-established video and the first display scheme may be a scheme of displaying thumbnail images corresponding to each of the remaining display items.

The display method may further include: extending the pre-established video to be displayed over the entire display, in response to subsequently sensing the second user interaction; and changing the video displayed to a video corresponding to an adjacent display item in a direction corresponding to the user interaction, in response to sensing the user interaction.

The pre-established video may be one of a plurality of video frames included in the contents, and in the displaying of the pre-established video over the entire display, the video corresponding to the contents may be displayed.

The display method may further include: in response to sensing the user interaction for changing a focus, changing the display scheme of the first display item to the first display scheme when a width of the pre-established video of the first display item is reduced in the first direction to be equal to or smaller than that of the second display item moving to the first region, depending on the user interaction, and changing the display scheme of the second display item to the third display scheme when the width of the second display item is increased in the first direction to be equal to or larger than that of the first display item.

In response to the display scheme of the first display item changing to the first display scheme, the first display item may include a first thumbnail section in which a thumbnail image corresponding to the first display item and the pre-established video are displayed while overlapping each other, and in response to the display scheme of the second display item changing to the third display scheme, the second display item may include a second thumbnail section in which a thumbnail image of the second display item and the pre-established video are displayed while overlapping each other.

The first region may be a region corresponding to a center of the plurality of display items.

The user interaction may be at least one of a command of moving a touch point on a touch pad from a first point to a second point, a command of manipulating one of 4-way buttons, and a command of orienting a pointing remote controller.

In the displaying of the plurality of display items, each of the display items included in the same category among the plurality of display items may be displayed to be continuously listed.

In the displaying of the plurality of display items, in response to a user command for changing an arrangement order of the plurality of display items is input, the plurality of display items may be rearranged depending on a category classification different from a previously displayed category classification.

According to an aspect of another exemplary embodiment, a display apparatus includes: a display configured to display a plurality of display items corresponding to a plurality of content items comprising a first display item displayed in a first region and remaining display items; a sensor configured to sense a user interaction; and a controller configured to control the display to display a first display item using a first display scheme, display the remaining display items using a second display scheme, and change the display scheme of the first display item to the second display scheme while moving the first display item in a direction corresponding to the user interaction, and change the display scheme of a second display item moving to the first region to the first display scheme in response to the user interaction.

The controller may be configured to control the display to display a thumbnail image corresponding to the first display item using the first display scheme in a block form having a first thumbnail width, and display a block form having a second thumbnail width narrower than the first thumbnail width.

The controller may be configured to control the display to display a block form having a color corresponding to an average value of pixels values included in thumbnail images displayed in the second display scheme.

The controller may be configured to control the display to change the display scheme of the second display item to the first display scheme by reducing a width of the first display item in a first direction and increasing a width of the second display item moving to the first region in the first direction, in a manner corresponding to the sensed user interaction.

The controller may be configured, in response to the width of the second display item moving to the first region being wider than that of the first display item, to control the display to change the display scheme of the first display item to the second display scheme and change the display scheme of the second display item moving the first region to the first display scheme.

The controller may be configured to control the display to display the first display item using a third display scheme and change the display scheme of the remaining display items to the first display scheme in response to the sensor sensing a second user interaction for extending the plurality of display items.

The controller may be configured to control the display to display a pre-established video using the third display scheme and display thumbnail images corresponding to each of the remaining items using the first display scheme.

The controller may be configured to control the display to extend the pre-established video displayed in the first region and display the extended pre-established video over the entire region of the display when the second user interaction is subsequently sensed by the sensor and change the displayed video to a video corresponding to an adjacent display item in a direction corresponding to the user interaction in response to sensing the user interaction by the sensor.

The controller may be configured to control the display to display one of the plurality of video frames included in the contents as the pre-established video and display videos corresponding to the contents from the pre-established video over the entire region of the display.

The controller may be configured to control the display to change the display scheme of the first display item to the first display scheme when a width of a pre-established video of the first display item is reduced in the first direction to be equal to or smaller than that of the second display item moving to the first region, depending on the user interaction and change the display scheme of the second display item to the third display scheme when the width of the second display item is increased in the first direction to be equal to or larger than that of the first display item, in the case in which the sensor senses the user interaction for moving the display item.

The controller may be configured to control the first display item to include a first thumbnail section in which a thumbnail image corresponding to the first display item and the pre-established video are displayed while overlapping each other when the display scheme of the first display item is changed to the first display scheme and the second display scheme of the second display item to include a second thumbnail section in which a thumbnail image of the second display item and the pre-established video are displayed while overlapping each other when the display scheme of the second display item is changed to the third display scheme.

The first region may be a region corresponding to a center of the plurality of display items.

The user interaction may be at least one of a command of moving a touch point on a touch pad from a first point to a second point, a command of manipulating one of 4-way buttons, and a command of orienting a pointing remote controller.

The controller may be configured to control each of the display items included in the same category among the plurality of display items to be continuously listed.

The controller may be configured to control the plurality of display items to be rearranged depending on a category classification different from a previously displayed category classification, in response to a user command for changing an arrangement order of the plurality of display items is input.

According to another aspect of an exemplary embodiment, a display method of a display apparatus includes: displaying a plurality of display items corresponding to a plurality of content items, the plurality of content items comprising a first display item displayed in a first region and remaining display items; displaying the first display item using a first display scheme and displaying the remaining display items using a second display scheme; and combining a plurality of display items included in a same category among the plurality of display items into an upper display item, in response to sensing a third user interaction for displaying an upper category of the display item.

In the changing, in response to sensing the third user interaction, the display schemes of the first display item and at least one display item included in the same category as the first display item may each be changed to the second display scheme, and display items other than the first display item and at least one display item included in the same category as the first display item may each be changed to an upper display item as the display items included in the same category are combined.

In response to subsequently sensing the third user interaction again, the first display item and at least one display item included in the same category as the first display item may be changed to the upper display item and combined with each other.

The upper display item may be displayed as a color corresponding to an average value of pixel values of a thumbnail image corresponding to at least one combined display item and may be a display item in a box form having a width proportional to the number of combined display items.

The first display scheme may be a scheme of displaying thumbnail images corresponding to the first display items and the second display scheme may be a scheme of displaying the remaining display items in a block form having a width narrower than that of the thumbnail image.

The display method may further include: in response to sensing a fourth user interaction for displaying a lower category of the upper display item, segmenting the upper display item to change the display scheme of the first display item located in the first region to the first display scheme and changing the display scheme of the remaining display items to the second display scheme to display the changed display items.

According to still another aspect of an exemplary embodiment, a display apparatus includes: a display configured to display a plurality of display items corresponding to a plurality of content items comprising a first display item displayed in a first region and remaining display items; a sensor configured to sense user interaction; and a controller configured to control the display to display a first display item using a first display scheme, display the remaining display items using a second display scheme, and combine display items included in a same category and change the combined display items to an upper display item in response to sensing the third user interaction for displaying the upper category of the display item.

The controller may be configured to change the display schemes of the first display item and at least one display item included in the same category as the first display item, respectively, to the second display scheme, in response to sensing the third user interaction, and combine display items other than the first display item and at least one display item included in the same category as the first display item and change the combined items to the upper display item.

The controller may be configured to combine and display as the upper display item, in response to subsequently sensing the third user interaction again, the first display item and at least one display item included in the same category.

The controller may be configured to control the upper display item to be displayed as a color corresponding to an average value of pixel values of a thumbnail image corresponding to at least one combined display item and is a display item in a box form having a width proportional to the number of combined display items.

The first display scheme may be a scheme of displaying thumbnail images corresponding to the first display items and the second display scheme may be a scheme of displaying the remaining display item in a block form having a width narrower than that of the thumbnail image.

The controller may be configured to segment the upper display item in response to sensing a fourth user interaction for displaying a lower category of the upper display item, to control the display to change the display scheme of the first display item to the first display scheme and change the display scheme of the remaining display items to the second display scheme to display the changed display items.

According to another aspect of an exemplary embodiment, a display apparatus includes: a display configured to display content; an interface configured to receive a user input; a controller configured to control the display to display a first icon and a second icon. One of the first icon and the second icon is a focused icon displayed in a focused icon format, and the focused icon is initially the first icon and, in response to the user input, the second icon is subsequently focused and displayed in the focused icon format.

The focused icon format may include a focused icon size and the one of the first icon and the second icon that is not the focused icon may be displayed in a background icon format that includes a background icon size and the focused icon size is larger than the background icon size.

In response to the user input, as the first icon transitions from the focused icon format to the background icon format, a size of the first icon may be gradually reduced from the focused icon size to the background icon size, and as the second icon transitions from the background icon format to the focused icon format, a size of the second icon may be gradually increased from the background icon size to the focused icon size.

The first icon may represent a first content category comprising a plurality of first content items and the second icon may represent a second content category comprising a plurality of second content items.

In response to the user input selecting the first icon, the first icon may be replaced with a first plurality of content items representing the plurality of first content items and in response to the user input selecting the second icon, the second icon may be replaced with a second plurality of content items representing the plurality of second content items.

Additional and/or other aspects and advantages will be set forth in part in the description which follows and, in part, will be obvious from the description, or may be learned by practice of exemplary embodiments.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Hereinafter, exemplary embodiments will be described in more detail with reference to the accompanying drawings. Further, when a detailed description for a known function or configuration may obscure the present disclosure, the detailed description therefor may be omitted. Further, the following terminologies are defined in consideration of the functions in the present disclosure, and may be construed in different ways by the intention of users and operators. Therefore, the definitions thereof should be construed based on the specification. Expressions such as "at least one of," when preceding a list of elements, modify the entire list of elements and do not modify the individual elements of the list.

Figure 1:
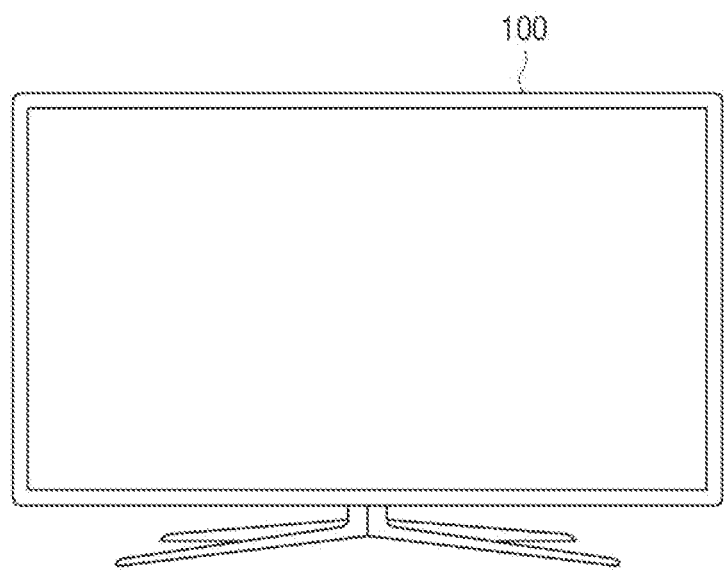
FIG. 1 is a diagram illustrating a display apparatus and a control apparatus according to an exemplary embodiment.
Figure 1:
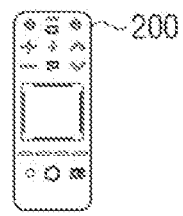

FIG. 1 is a diagram illustrating a display apparatus 100 and a control apparatus 200 according to an exemplary embodiment. As illustrated in FIG. 1, the display apparatus 100 may be a TV, which is only an example. Therefore, the display apparatus 100 may be implemented as any of various electronic devices, such as a mobile phone, a tablet PC, a digital camera, a camcorder, a notebook personal computer (PC), a desktop PC, and a personal digital assistant (PDA) in which a display 110 is installed.

The control apparatus 200 may be implemented as any of various types of apparatuses for controlling the display apparatus 100, such as a remote controller or a mobile phone. When the control apparatus 200 is implemented as a remote controller, the control apparatus 200 may include a touch pad. In this case, the display apparatus 100 may be controlled by a touch input which is input through the touch pad.

Alternatively, the control apparatus 200 may include mechanical or electrical inputs, such as 4-way keys. That is, the display apparatus 100 may be controlled by a user input to any one of the 4-way keys. Icons which represent a plurality of content items are displayed on the display apparatus 100. A case in which an icon located at a middle of the plurality of icons is highlighted will be described as an example. When a user presses a right direction key among the 4-way keys which are included in the control apparatus 200, the highlighted icon may be changed.

The control apparatus 200 may also be a pointing device. That is, a pointer on the display of the display apparatus 100 may move, or various menus displayed may be selectively enabled, depending on a displacement value of a subject, such as a user's finger moving on a surface of the control apparatus 200. Alternatively, the display apparatus 100 may also be controlled by the user inclining the control apparatus 200 in any direction.

Figure 2:
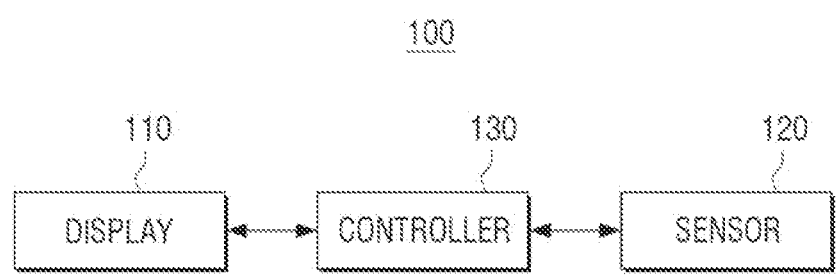
FIG. 2 is a block diagram schematically illustrating a configuration of the display apparatus according to an exemplary embodiment.

Meanwhile, FIG. 2 is a block diagram illustrating a configuration of the display apparatus 100 according to an exemplary embodiment. The display apparatus 100 includes a display 110, a sensor 120, and a controller 130.

The display 110 is a component for displaying a video. The display 110 may display content received through a broadcast channel. That is, the display apparatus 100 may receive various broadcasting signals transmitted from a broadcasting station through an RF communication network, and may also receive content through an IP network from various servers. Therefore, the display 110 may display the received content.

Further, the display 110 may display a plurality of display items corresponding to a plurality of content items in one region of a display. For example, a plurality of thumbnail images corresponding to the plurality of content items may be displayed at a lower end of the display 110 as display items.

Meanwhile, the sensor 120 is a component for sensing a user interaction. In particular, the sensor 120 may sense the user interaction for moving or extending, and cause display items to be displayed on the display 110 via the controller 130. In particular, the sensor 120 may also sense the user interaction through a separate control apparatus 200.

Meanwhile, the controller 130 is a component for controlling a general operation of the display apparatus 100. The controller 130 may control the display 110 based on received inputs to display a first display item among the plurality of displayed display items in a first region using a first display scheme, and display the remaining display items, other than the first display item located in the first region among the plurality of display items, using a second display scheme. In particular, the controller 130 may control the display 110 to display a thumbnail image corresponding to the first display item using the first display scheme, and display the remaining display items, or a second display item, in a block form having a width narrower than that of the thumbnail image using the second display scheme. In particular, the second display scheme may be a block form having a color corresponding to an average value of pixel values included in the thumbnail images corresponding to each of the second display items.

Meanwhile, when the user interaction for moving the display item is sensed by the sensor 120, the controller 130 may change the first display item to the second display scheme while moving the first display item to one side corresponding to the user interaction. Further, the controller 130 may perform a control to change the display scheme of the second display item moving towards the first region among the remaining display items to the first display scheme.

In detail, the controller 130 may reduce a width of the first display item in a first direction and increase a width of the second display item moving towards a first region in the first direction depending on the user interaction sensed by the sensor 120, and to perform a control to change the display scheme of the second display item to the first display scheme.

Further, when the width of the second display item moving to the first region is larger than that of the first display item reduced in the first direction depending on the user interaction, the controller 130 may perform a control to change the display scheme of the first display item to the second display scheme, and change the display scheme of the second display item moving towards the first region to the first display scheme.

Meanwhile, when a second user interaction for extending the plurality of display items is sensed by the sensor 120, the controller 130 may perform a control to display the first display item using a third display scheme and change the display scheme of the remaining display items, other than the first display item located in the first region among the plurality of display items, to the first display scheme.

The third display scheme may be a scheme of displaying a pre-established video having an aspect ratio different from and more extended than a thumbnail image corresponding to the first display item.

That is, the thumbnail image may be an image having an aspect ratio of 3:5 and an aspect ratio of the pre-established video different from and more extended than the thumbnail image may be 3:1. The foregoing ratios are only provided as examples and therefore the ratios are not limited thereto. Further, the image used in the third display scheme may be one of a plurality of video frames included in video content corresponding to the display items displayed in the third display scheme.

Meanwhile, when the second user interaction is sensed again by the sensor 120, the controller 130 may control the pre-established video displayed in the first region to be extended, and display the extended pre-established video over the entire display region of the display 110. Further, the controller 130 may play the video content corresponding to the pre-established video displayed in the first region from the pre-established video. That is, when the pre-established video is one of the plurality of frames included in the video content, the controller 130 may control the video content to be played from a frame corresponding to the pre-established video.

That is, in the case in which the first display items located in the first region are displayed as the pre-established video and the display items located in the remaining regions are displayed in a block form having a narrower width and having a different color, when the second user interaction is sensed by the sensor 120, the controller 130 may control the pre-established video displayed in the first region to be displayed over the entire display region of the display 110.

When the pre-established video is displayed in the entire display region of the display 110 and the user interaction for moving the plurality of display items is sensed by the sensor 120, the controller 130 may change the video displayed through the display 110 in the first direction corresponding to the user interaction.

Meanwhile, in the case in which the user interaction for moving the display item is sensed, the controller 130 may perform a control to change the display scheme of the first display item to the first display scheme when the width of the pre-established video of the first display item is reduced in the first direction and the width of the first display item is equal to or smaller than that of the second display item moving to the first region depending on the user interaction. Further, the controller 130 may perform a control to change the display scheme of the second display item to a third display scheme when the width of the second display item moving to the first region is increased in the first direction to be equal to or larger than that of the first display item.

Further, the controller 130 may control the first display item to include a section in which a thumbnail image corresponding to the first display item and the pre-established video are displayed while overlapping each other, when the display scheme of the first display item is changed to the first display scheme.

That is, the controller 130 may control the thumbnail image and the pre-established video to be displayed while overlapping each other from the moment the width of the pre-established video of the first display item becomes 70% of the original width, to the moment the width of the pre-established video of the first display item becomes 50% of the original width. The foregoing ratios of width are exemplary only, and therefore the display apparatus 100 may make the section in which the thumbnail image and the pre-established video overlap each other at different points depending on the setting, or may be set not to have the section in which thumbnail image and the pre-established video displayed to be overlapping with each other.

Further, the controller 130 may control the second display item to include a section in which the thumbnail image of the third display item and the pre-established video are displayed while overlapping each other, when the display scheme of the second display item is changed to the third display scheme.

That is, the controller 130 may control the thumbnail image and the pre-established video to be displayed while overlapping each other from the moment the width of the thumbnail image of the second display item becomes 120% of the original width to the moment the width of the thumbnail image of the second display item becomes 150% of the original width. The foregoing ratios of width are exemplary only, and therefore the display apparatus 100 may make the section in which the thumbnail image and the pre-established video overlap each other at different points depending on the setting, or may be set not to have the section in which thumbnail image and the pre-established video displayed to be overlapping with each other.

As described above, the display apparatus 100 displays the section in which the thumbnail image and the pre-established video are displayed while overlapping each other while the width of the first display item is reduced and the width of the second display item moving to the first region is increased, such that the user may obtain a display effect that the plurality of display items appears to be moving seamlessly.

In the foregoing description, the first region may be a region corresponding to a center of the plurality of display items.

Further, when the control apparatus 200 for controlling the display apparatus 100 includes a touch pad, the user interaction may be moving a touched point on the touch pad from a first point to a second point. Alternatively, when the control apparatus 200 includes 4-way buttons, the user interaction may be pressing one of the 4-way buttons. Further, when the control apparatus 200 is a pointing remote controller, the user interaction may also be inclining the pointing remote controller in one direction.

Meanwhile, in the case in which the first display item located in the first region among the plurality of display items is displayed by the first display scheme and the remaining display items, other than the first display item located in the first region among the plurality of display items, are displayed by the second display scheme, when a third user interaction for displaying an upper category of the display item is sensed by the sensor 120, the controller 130 may perform a control to combine the display items included in the same category among the plurality of display items, and change the combined display items to an upper display item.

That is, when the third user interaction is sensed by the sensor 120, the controller 130 may change the display schemes of the first display item and at least one display item included in the same category as the first display item, respectively, to the second display scheme, and may combine display items other than the first display item and at least one display item included in the same category as the first display item and change the combined items to an upper display item.

Further, when the third user interaction is sensed again, the controller 130 may combine the first display item with at least one display item included in the same category, and change the combined display item to the upper display item.

In this case, the upper display item has a color corresponding to an average value of pixel values of a thumbnail image corresponding to at least one combined display item and may be a display item in a box form having a width proportional to the number of combined display items as the upper display item.

Further, when a fourth user interaction for displaying a lower category of the upper display item is sensed by the sensor 120, the controller 130 may segment the upper display item and perform a control to change the display scheme of the first display item located in the first region to the first display scheme, and change the display scheme of the remaining display items, other than the first display item located in the first region, to the second display scheme, thereby displaying the changed display items.

Figure 3:
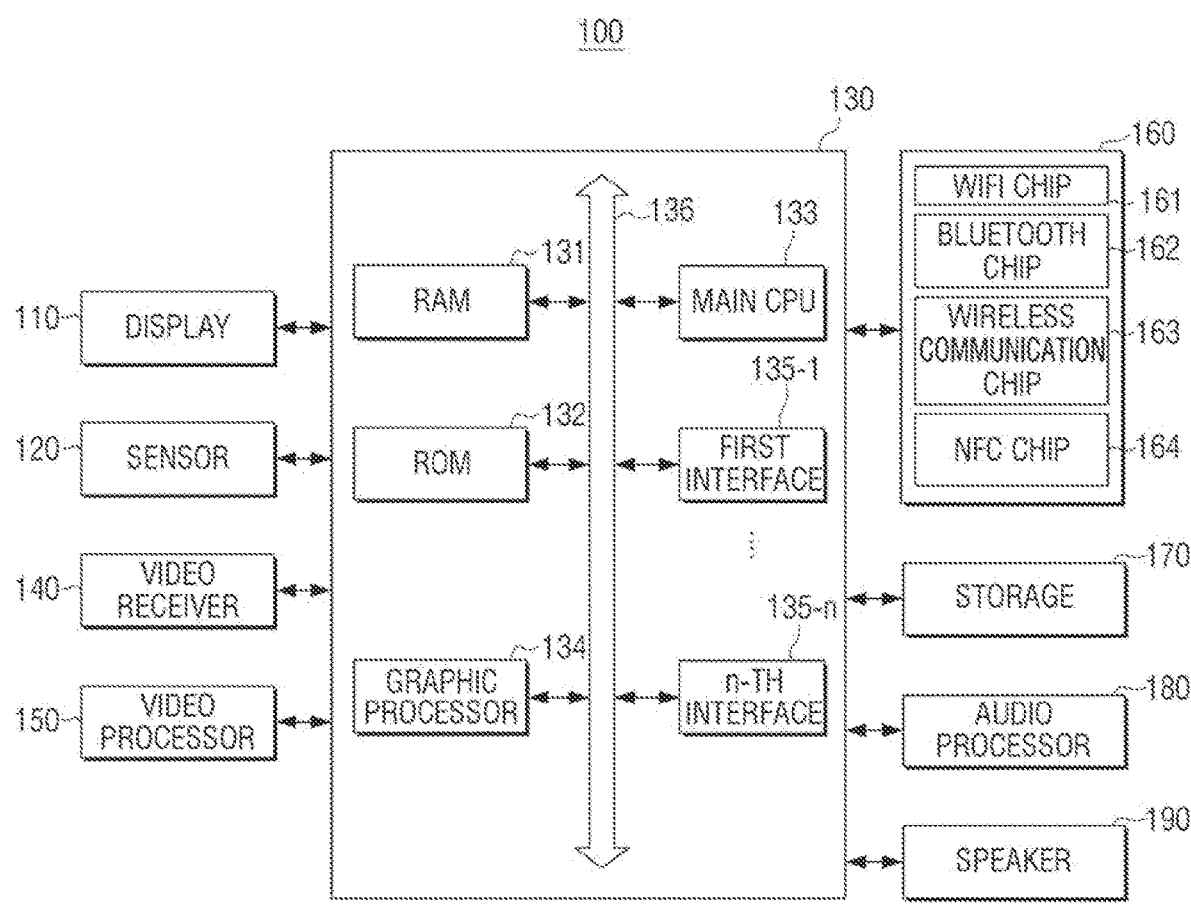
FIG. 3 is a block diagram illustrating in detail the configuration of the display apparatus according to an exemplary embodiment.

FIG. 3 is a block diagram illustrating in detail the configuration of the display apparatus 100 according to the exemplary embodiment. As illustrated in FIG. 3, the display device 100 according to the exemplary embodiment includes the display 110, the sensor 120, the controller 130, a video receiver 140, an image processor 150, a communicator 160, a storage 170, an audio processor 180, and a speaker 190.

The display 110 is a component for displaying a video. The display 110 may display content received through a broadcast channel. That is, the display apparatus 100 may receive various broadcasting signals transmitted from a broadcasting station through an RF communication network, and may also receive content through an IP network from various servers. The display 110 may display the received content.

Further, the display 110 may display a plurality of display items corresponding to a plurality of content items in one region of a display. For example, the thumbnail images corresponding to the plurality of content items may be displayed at the lower end of the display 110 as the display items.

The positions and the display scheme of the plurality of display items which are displayed by the display 110 may be changed depending on the control of the controller 130.

Meanwhile, the sensor 120 is a component for sensing a user interaction. In particular, the sensor 120 may sense the user interaction for moving or extending, and displaying items displayed on the display 110. In particular, when the user interaction is input through the separate control apparatus 200, the sensor 120 may receive the user interaction input to the control apparatus 200.

In detail, when the control apparatus 200 includes a touch pad for receiving the user interaction and the user interaction of dragging from the first region to the second region of the touch pad is input, the sensor 120 may sense that the user interaction for performing the pre-established operation, depending on an input direction of a touch command, is input through the touch pad.

Alternatively, when the control apparatus 200 includes the 4-way buttons to receive the user interaction, and the user interaction of pressing a button indicating a right direction is input, the sensor 120 may sense that the user interaction for performing the pre-established operations depending on each of the 4-way buttons is input. For example, when the plurality of display items are displayed, the sensor 120 may sense that the user interaction for moving the highlighted item to the right is input.

Meanwhile, the video receiver 140 receives video data through various sources. For example, the video receiver 140 may receive broadcast data from an external broadcasting station, receive the video data from external apparatuses (for example, digital versatile disc (DVD), Blu-ray Disc (BD) player, and the like), and receive the video data stored in the storage 170. In particular, the video receiver 140 may include a plurality of video receiving modules for receiving video data from a plurality of sources and displaying a plurality of screens on a single display screen. For example, the video receiver 140 may include a plurality of tuners for simultaneously receiving a plurality of broadcasting channels and one or more of the plurality of broadcasting channels that are received may be displayed on the display 110.

The video processor 150 is a component for processing video data received by the video receiver 140. The video processor 150 may perform various image processing on the video data, such as decoding, scaling, noise filtering, frame rate conversion, and resolution conversion. Meanwhile, the video processor 150 may include a plurality of video processing modules for processing videos corresponding to a plurality of content items.

Meanwhile, the communicator 160 is a component for performing communication with various types of external devices or external servers depending on various types of communication schemes. That is, the communicator 160 may perform communication with the external apparatuses by including various communication modules, such as a WiFi chip 161, a Bluetooth chip 162, a wireless communication chip 163, and an Near field communication (NFC) chip 164. In this case, the WiFi chip 161, the Bluetooth chip 162, and the NFC chip 164 each perform communication by, respectively, a WiFi scheme, a Bluetooth scheme, and an NFC scheme. Among those, the NFC chip 164 is a chip which is operated by the NFC scheme using a band of 13.56 MHz among various RF-ID frequency bands, such as 135 kHz, 13.56 MHz, 433 MHz, 860 to 960 MHz, and 2.45 GHz. The WiFi chip 161 or the Bluetooth chip 162 first transmits and receives various connection information, such as an SSID and a session key, and then performs a communication connection using the various connection information, thereby transmitting and receiving various information. The wireless communication chip 163 is a chip which performs communication depending on various communication standards, such as Institute of Electrical and Electronics Engineers (IEEE), Zigbee, 3rd generation (3G), 3rd generation partnership project (3GPP), long term evolution (LTE), and the like.

The storage 170 stores various modules for driving the display apparatus 100. A configuration of the storage 170 will be described with reference to FIG. 4.

Figure 4:
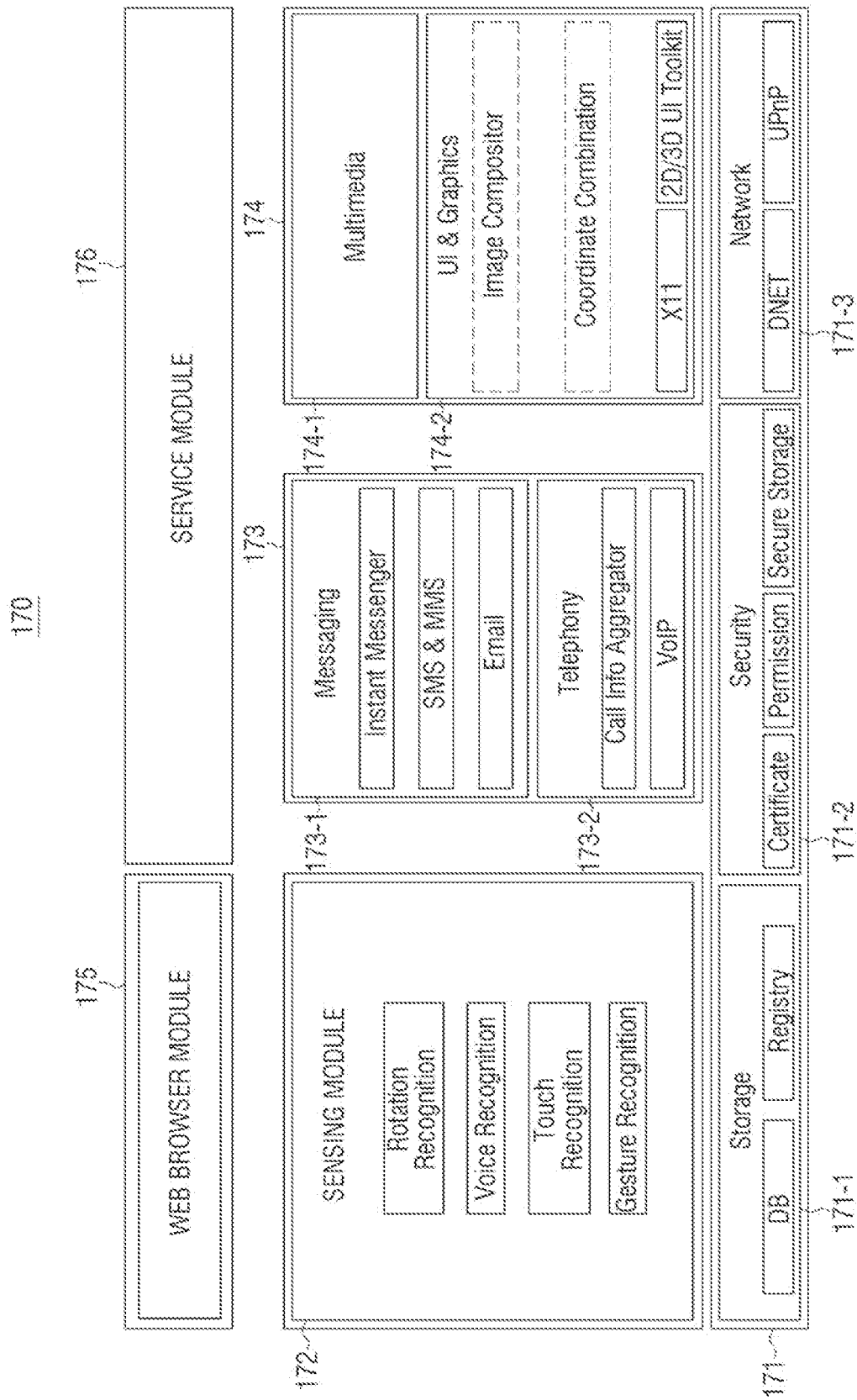
FIG. 4 is a block diagram illustrating a configuration of a storage of the display apparatus according to an exemplary embodiment.

FIG. 4 is a diagram illustrating a configuration of software stored in the storage 170.

Referring to FIG. 4, the storage 170 may be stored with software including a base module 171, a sensing module 172, a communication module 173, a presentation module 174, a web browser module 175, and a service module 176.

The base module 171 is a fundamental module which processes signals transferred from each hardware component of the display apparatus 100, and transfers the processed signals to an upper layer module. The base module 171 includes a storage module 171-1, a security module 171-2, a network module 171-3, and the like. The storage module 171-1 is a program module which manages database (DB) or registry. A main CPU 133 may use the storage module 171-1 to access the database in the storage 170, thereby providing access to various data. The security module 171-2 is a program module which supports certification for hardware, permission requests, secure storage, and the like. Further, the network module 171-3 includes a DNET module, a UPnP module, and the like, as a module for supporting a network connection.

The sensing module 172 is a module which aggregates information from various sensors and analyzes and manages the aggregated information. The sensing module 172 may also include a head direction recognition module, a face recognition module, a speech recognition module, a motion recognition module, an NFC recognition module, and the like.

The communication module 173 is a module which performs communication with the outside. The communication module 173 may include a messaging module 173-1 including a messenger program, a short message service (SMS) & multimedia message service (MMS) program, an email program and the like, and a telephone module 173-2 including a call info aggregator program module, a VoIP module, and the like.

The presentation module 174 is a module for configuring a display screen. The presentation module 174 includes a multimedia module 174-1 for playing and outputting multimedia content and an UI rendering module 174-2 for performing UI and graphic processing. The multimedia module 174-1 may include a player module, a camcorder module, a sound processing module, and the like. Therefore, the multimedia module 174-1 performs an operation of playing various multimedia content to generate and play a screen and a sound. The UI rendering module 174-2 may include an image compositor module which combines images, a coordinate combination module which combines and generates coordinates on a screen on which an image is displayed, an X11 module which receives various events from hardware, a 2D/3D UI toolkit which provides a tool for configuring a 2D or 3D type of UI, and the like.

The web browser module 175 is a module which performs web browsing to access a web server. The web browser module 175 may include various modules, such as a web view module which configures a web page, a download agent module which performs download, a bookmark module, a webkit module, and the like.

The service module 176 is a module which includes various applications for providing various services. In detail, the service module 176 may include various program modules, such as an social networking service (SNS) program, a content playback program, a game program, an electronic book program, a calendar program, an alarm management program, and other widgets.

FIG. 4 illustrates various program modules, but various program modules illustrated may be partially omitted, modified, or added depending on a kind and characteristics of the display apparatus 100. For example, the service module 176 may be configured to further include a location based module which supports a location based service by interworking with hardware, such as a Global Positioning System (GPS) chip.

Referring again to FIG. 3, the audio processor 180 is a component for performing processing on audio data. The audio processor 180 may perform various processing on audio data, such as decoding, amplification, and noise filtering. Meanwhile, the audio processor 180 may include a plurality of audio processing modules for processing audio corresponding to a plurality of content items.

The speaker 190 is a component for outputting various alarm sounds or speech messages in addition to various audio data which are processed by the audio processor 180. Meanwhile, the display apparatus 100 may also include other audio outputters, such as an audio output terminal as a component for outputting an audio in addition to a speaker 190.

The controller 130 controls a general operation of the display apparatus 100 by using various programs stored in the storage 170.

As illustrated in FIG. 3, the controller 130 includes an RAM 131, an ROM 132, a graphic processor 134, a main CPU 133, first to n-th interfaces 135-1 to 135-n, and a bus 136. In this case, the RAM 131, the ROM 132, the graphic processor 134, the main CPU 133, the first to n-th interfaces 135-1 to 135-n, and the like, may be connected to each other via the bus 136.

The ROM 132 is stored with a set of commands for system booting. When a turn on command is input, and thus power is supplied, the main CPU 133 copies an operating system (O/S) stored in the storage 170 to the RAM 131 according to the command stored in the ROM 132, and executes the O/S to boot the system. When the booting is completed, the main CPU 133 copies various application programs stored in the storage 170 to the RAM 131 and executes the application programs copied to the RAM 131 to perform various operations.

The graphic processor 134 uses an operator and a renderer to generate a screen including various objects, such as an icon, an image, and a text. The operator operates attribute values, such as a coordinate value, a form, a size, and a color, which represent each object depending on a layout of the screen, by using the user interaction sensed by the sensor 120. The renderer generates a screen of various layouts, including an object based on attribute values which are operated by the operator. The screen generated by the renderer is displayed in a display region of the display 110.

The main CPU 133 accesses the storage 170 to perform booting using the O/S stored in the storage 170. Further, the main CPU 133 performs various operations using various programs, content, data, and the like, which are stored in the storage 170.

The first to n-th interfaces, 135-1 to 135-n, are connected to the foregoing various components. One of the interfaces may be a network interface which is connected to the external apparatuses through a network.

In particular, the controller 130 may control the plurality of display items corresponding to the plurality of content items to be displayed in one region of the display 110. Further, when the user interaction is sensed by the sensor 120, the controller 130 may control the displayed display item to be moved, extended, reduced, changed, or the like, depending on a form of the sensed user interaction.

First, a method for sensing by the sensor 120, a user interaction by the control apparatus 200 including a touch pad 210 will be described with reference to FIGS. 5A to 5C.

Figure 5A:
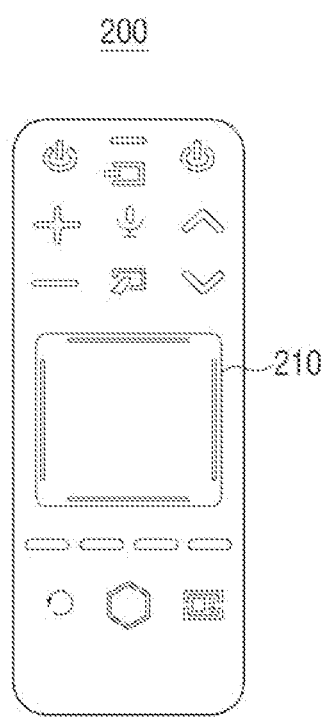
FIGS. 5A to 5C are diagrams illustrating a method of sensing a user interaction using a control apparatus including a touch pad according to an exemplary embodiment.

To control the display apparatus 100 remotely, as illustrated in FIG. 5A, the control apparatus 200 including a touch pad 210 may be used.

Therefore, the sensor 120 may sense the user interaction performing a drag, touch, or flip through the touch pad 210 of the control apparatus 200. Further, the display apparatus 100 may be controlled depending on a characteristics (for example, direction in which a drag command is input, time when a touch command is input, and the like) of a sensed user interaction.

Figure 5B:
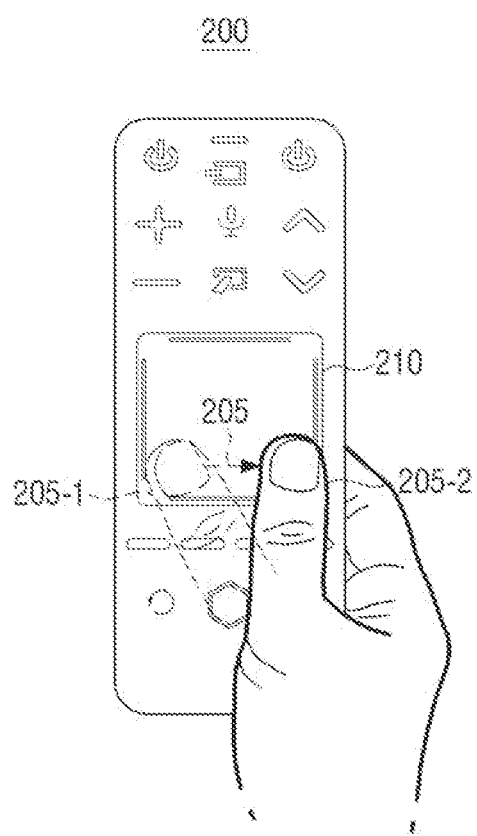

For example, as illustrated in FIG. 5B, when a user interaction 205 of dragging on the touch pad 210 from a first point 205-1 to a second point 205-2 is sensed, the display apparatus 100 may control the plurality of displayed display items to move from left to right. That is, the display apparatus 100 may move the plurality of display items in a direction corresponding to the direction of the sensed user interaction 205.

Further, the display apparatus 100 may control a moving speed of the plurality of displayed display items to be changed depending on the sensed input, for example, a speed of the drag sensed on the touch pad 210.

Figure 5C:
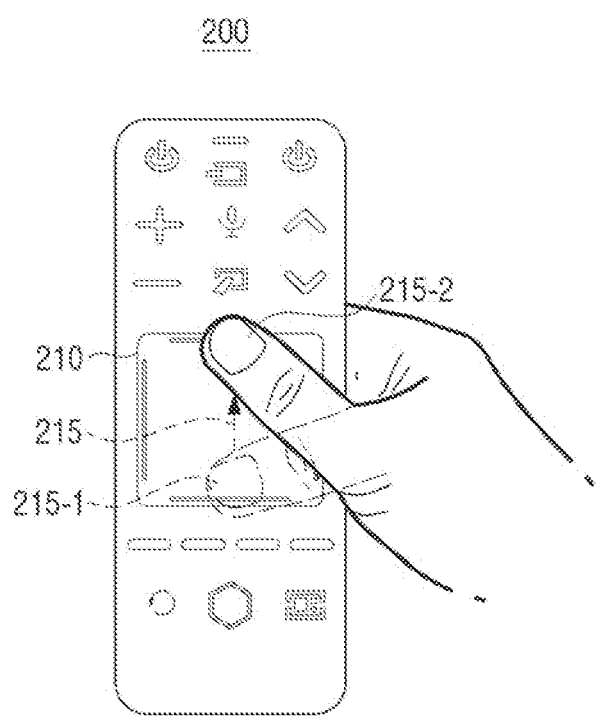

Meanwhile, as illustrated in FIG. 5C, when a second user interaction 215 to drag the touch pad from a third point 215-1 to a fourth point 215-2 is sensed by the sensor 120, the display apparatus 100 may control the plurality of displayed display items to be displayed in an extended manner. Alternatively, when the user interaction to drag the touch pad in an direction opposite to the second user interaction 215, as illustrated in FIG. 5C, is sensed, the display apparatus 100 may reduce and display the reduced display items.

Further, the display apparatus 100 may display a category of the plurality of displayed display items while changing the category of the plurality of displayed display items to the upper category by the second user interaction 215. A detailed method for changing the category of the plurality of displayed display items by the user interaction will be described below.

Figure 6:
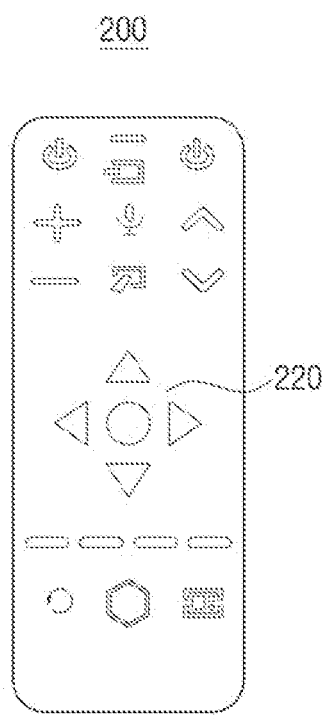
FIG. 6 is a diagram illustrating a control apparatus including 4-way buttons according to an exemplary embodiment.

Meanwhile, as illustrated in FIG. 6, the control apparatus 200 may include 4-way buttons 220 instead of the touch pad 210. That is, the sensor 120 may sense the user interaction of pressing the 4-way buttons 220 to control the display of the plurality of display items.

However, the cases in which the control apparatus 200 includes the touch pad 210 and the 4-way buttons 220 are only provided as examples, and therefore the control apparatus 200 may include both of the touch pad 210 and the 4-way buttons 220 to be able to sense various types of user interactions. Alternatively, the control apparatus 200 may be implemented as a pointing remote controller form.

That is, when the control apparatus 200 is implemented as a pointing remote controller, a function of the display apparatus 100 may be controlled depending on a direction in which the control apparatus 200 is inclined or an inclined angle of the control apparatus 200.

The control apparatus 200 may be a pointing remote controller including the touch pad 210. In this case, the function of the display apparatus 100 may be controlled by the user command which controls an inclined angle of the control apparatus 200 together with the touch input through the touch pad 210.

Meanwhile, the control apparatus 200 may be implemented as the pointing remote controller and additionally includes the touch pad 210 and the 4-way buttons 220.

Hereinafter, a method for changing, by the display apparatus 100, a display scheme while the plurality of display icons move will be described with reference to FIGS. 7A to 7E. In particular, FIGS. 7A to 7E are diagrams of an exemplary embodiment of the display apparatus 100 for displaying the display item for the video content, such as a movie or a drama.

Figure 7A:
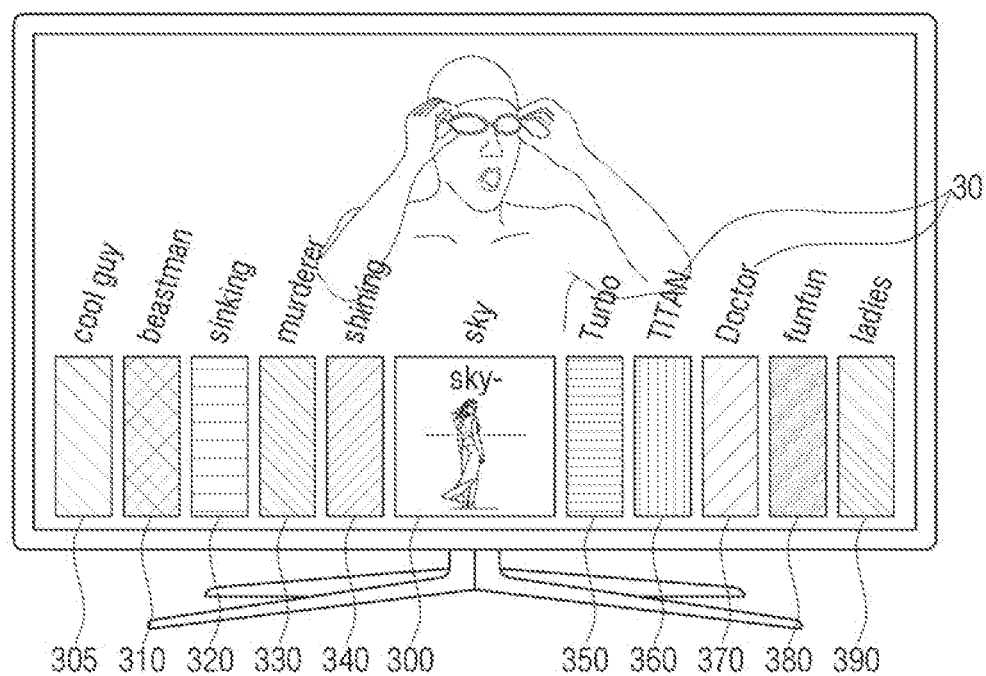
FIGS. 7A to 7E are diagrams illustrating a method for changing a display scheme while a plurality of display items move according to an exemplary embodiment.

FIG. 7A is a diagram illustrating an exemplary embodiment in which the plurality of display items corresponding to the plurality of content items is displayed at a lower end of the display 110. That is, the display 110 may display blocks, having different colors and having a form in which a width of each content is smaller than a height, at a lower portion thereof as the display item.

The blocks may have the same width. However, the width of the block may be set differently depending on the setting of the user or the importance, characteristics, and the like, of content represented by each block.

For example, a width of a block corresponding to the video content that is repeatedly selected and played by the user may be displayed to be wider than that of other blocks. Alternatively, to recommend the video content corresponding to a genre of the repeatedly selected video content, to the user, the width of the block corresponding to the recommended content may also be displayed wider than that of other blocks.

Further, to highlight one of the plurality of display items, the display item which is located at a central portion may be displayed by a display scheme different from the remaining display items. FIG. 7A is a diagram illustrating an exemplary embodiment in which the display 110 highlights the display item located at the central portion as a thumbnail image and displays the highlighted display item.

The thumbnail image may be an image representing the displayed content. For example, when the plurality of displayed content is for a movie or a drama, the thumbnail image may be a poster of the movie or drama. The thumbnail image may be stored in the storage 170. Further, the display apparatus 100 may receive the thumbnail image at a preset period from an external server or via wireless communication and store the received thumbnail image in the storage 170. The display apparatus 100 may receive the thumbnail image from a content provider which provides content, such as a live TV broadcast.

The display 110 may further display a box enclosing the thumbnail image as highlight.

Further, the display 110 may display names 30 corresponding to each content at an upper end of the displayed blocks. That is, in the highlighted display item, the content names are often included in the thumbnail image, and therefore the content names may be easily appreciated.

However, the remaining display items have a simple block form having different colors, and it may be difficult to know which content is represented. Therefore, the display 110 may display the content names 30 at the upper ends of each display item.

Due to the length of the content names 30, it may be difficult to horizontally display the content names 30 at the upper end of the block. Therefore, the display apparatus 100 may display the content names 30 in an inclined form.

The display apparatus 100 may sequentially display the plurality of display items corresponding to the plurality of content items depending on a genre. In this case, the display 110 may display a genre at the lower end of the display item.

For example, as illustrated in FIG. 7A, when "cool guy 305" and "beastman 310" are of a mystery genre, "sinking 320", "murderer 330", "shining 340", and "sky 300" are of a thriller genre, and "Turbo 350", "TITAN 360" are of a horror genre, and "Doctor 370", "funfun 380", "ladies 390" are of a drama genre, the display 110 may display "mystery" on a lower end of a block representing the "cool guy 305" and "beastman 310" in a horizontal direction. Further, the display 110 may display "thriller" on a lower end of a block representing the "sinking 320", the "murderer 330", the "shining 340", and the "sky 300" in a horizontal direction, display "horror" at a lower end of a display items representing the "Turbo 350" and the "TITAN 360" in a horizontal direction, and display the "drama" at a lower end of a block representing the "Doctor 370", the "funfun 380", and the "ladies 390" in a horizontal direction.

A word representing a genre displayed at the lower end may also be displayed over the lower end of all of the display items which are included in the corresponding genre. However, the number of display items which are included in each genre is generally different, and therefore the display 110 may display a word representing a genre at the lower end of the display item which is located at a start portion of the genre. That is, depending on a length of a word representing a genre, the genre may be, for example, displayed over two display items, or the genre may be displayed over three display items.

Meanwhile, when a user command for changing an arrangement of the display items is input, the display apparatus 100 may change the arrangement of the display items depending on a newly established standard and display the changed arrangement of the display items.

For example, the display apparatus may classify the display item into content with a bookmark established by a user, content frequently played by a user, and other content and display the classified display item by the user command.

That is, as described above, in the case in which the display item is displayed depending on the "mystery", "thriller", "horror", and "drama" genres, when the user command for changing the arrangement of the display item depending on the preference is input, the display apparatus 100 may display the display item in an order of the content with a bookmark, the content frequently played by a user, and other content.

Even in this case, the display apparatus 100 may display the first display item, which is located in the first region among the plurality of display items, as the thumbnail image and display the remaining display items in the block form. However, instead of a genre name, such as "mystery" and "thriller", words such as "favorite", "frequent play", and "low play frequency" may be displayed at the lower end of the display item.

A standard to change the arrangement of the display item may vary, for example, as a kind of content, a content provider, characters appearing in content, and content providing country.

Further, the remaining display items, other than "sky 300" which is positioned at the central portion and is highlighted among the plurality of display items, have a block form, and may be displayed in different colors. A color of the block may be determined by various methods. For example, the display apparatus 100 may determine the color of the block using the color values of the thumbnail images corresponding to each content.

For example, the display apparatus 100 may calculate the average value of pixel values of the thumbnail image corresponding to each content to determine the color corresponding to the calculated average value as the colors of each block.

Alternatively, the display apparatus 100 may store a plurality of themes for representing the display item in the storage 170 and determine the color of the display item depending on the theme set by the user.

For example, when a "mono theme" among the plurality of themes stored in the storage 170 is selected, the display apparatus 100 may display the plurality of blocks by using white, gray, black colors and the thumbnail image.

Meanwhile, when the user interaction 205 as described in FIG. 5B is sensed, the plurality of display items move in the horizontal direction. In particular, the user interaction 205 of the FIG. 5B is the user interaction which performs dragging from left to right, and therefore the plurality of display items may move from left to right to correspond to the direction of the sensed user interaction. That is, in FIG. 7A, the central portion may be changed from the "sky 300" to the "shining 340".

Further, when the user interaction of dragging on the touch pad 210 from right to left, which is an opposite direction to the user interaction 205 of FIG. 5B, is sensed, the plurality of display items may move from right to left to correspond to the direction of the sensed user interaction. That is, in FIG. 7A, the central portion may be changed from the "sky 300" to the "Turbo 350".

Referring to FIGS. 7B to 7E, a process of changing the highlight of the central portion of the display item from the "sky 300" to the "Turbo 350" will be described in detail.

When the user interaction of dragging on the touch pad 210 of the control apparatus 200 from right to left is sensed, the display 110 may display the plurality of display items as moving from right to left. Therefore, the highlighted thumbnail image of the central portion is also changed depending on the moving direction of all the display items.

Figure 7B:
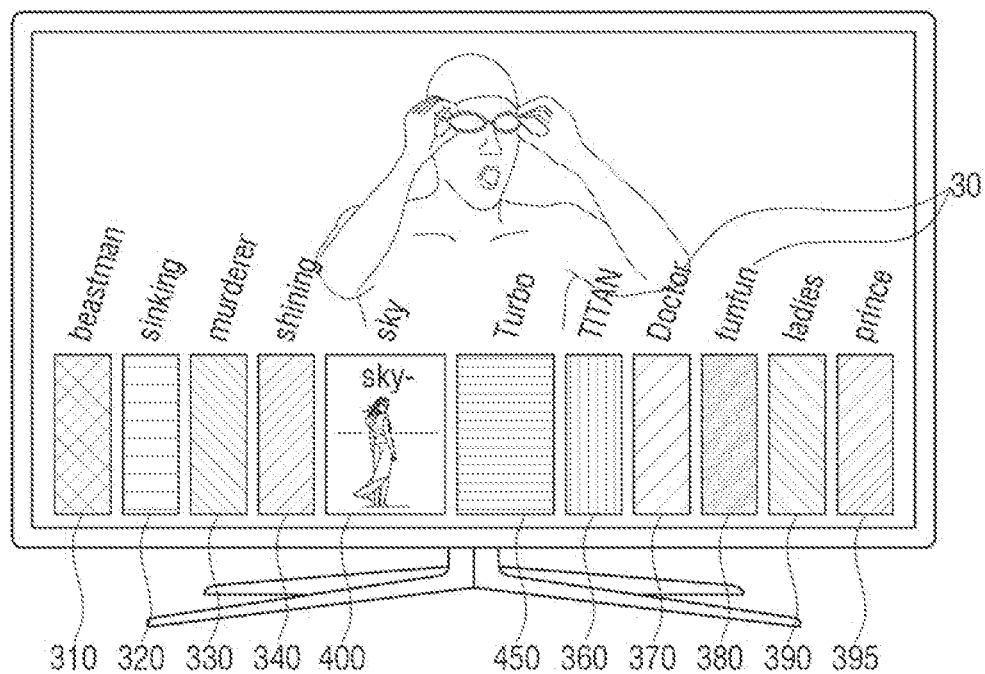

First, as illustrated in FIG. 7B, the thumbnail image of the highlighted "sky 400" has a narrow width while moving from right to left by the user interaction. As the width of the thumbnail image of the highlighted "sky 400" is narrow, the width of the block corresponding to the "Turbo 450", which is located to the right of the thumbnail image of the "sky 400", is widened.

When the plurality of display items move, the content names 30, which are displayed at the upper ends of each item, are displayed while moving as much as the movement of the display item.

In the state illustrated in FIG. 7B, when the user takes his/her finger off from the touch pad 210, the display items may return to the display state of FIG. 7A, as if the result of an elastic force.

Figure 7C:
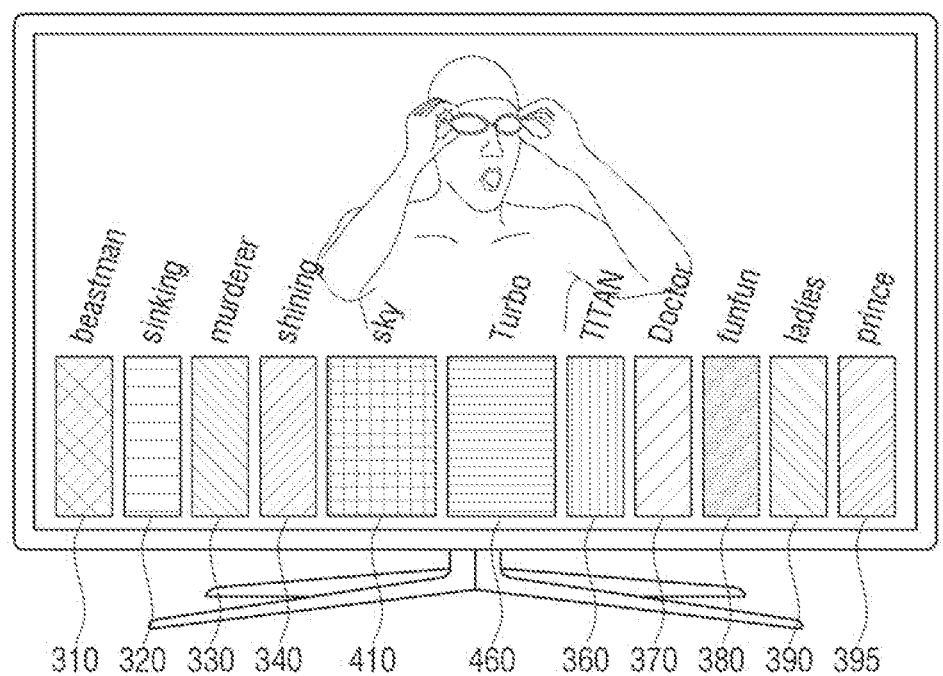

When the touch input is continued from the right of the user to the left, as illustrated in FIG. 7C, all the display items corresponding to the "sky 410" and the "Turbo 460" have a block form at the moment that the widths of the display items corresponding to the originally highlighted "sky 410" and "Turbo 460" are the same.

Figure 7D:
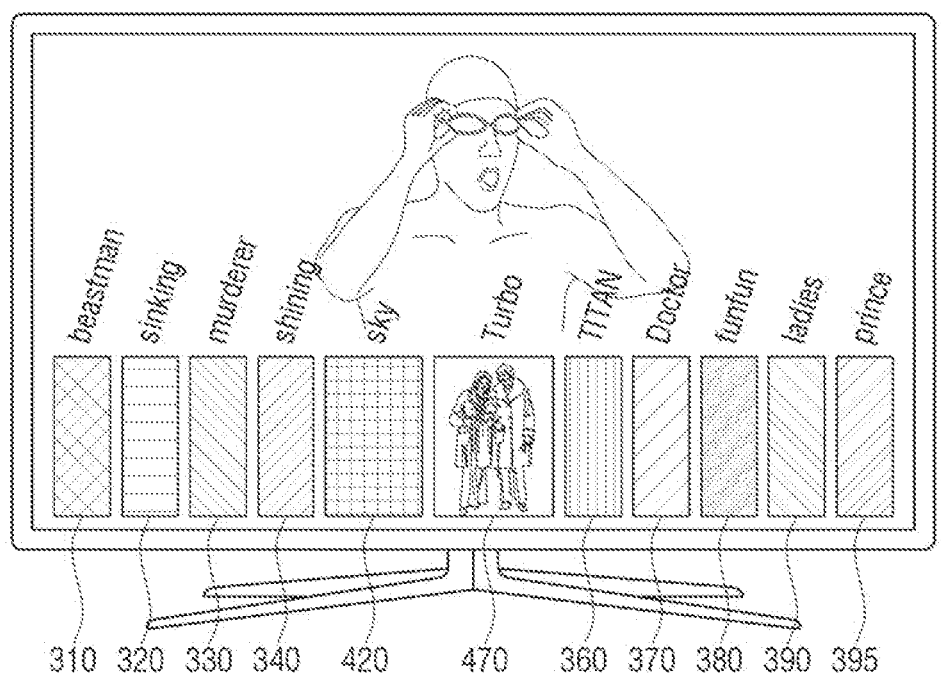

When all the display items corresponding to the "sky 410" and the "Turbo 460" have the block form, and then the width of the display item corresponding to the "Turbo" 470 is wider than that of the display item corresponding to the "sky 420", as illustrated in FIG. 7D, the display scheme of the display item corresponding to the "Turbo 470" is changed from the block to the thumbnail image.

Figure 7E:
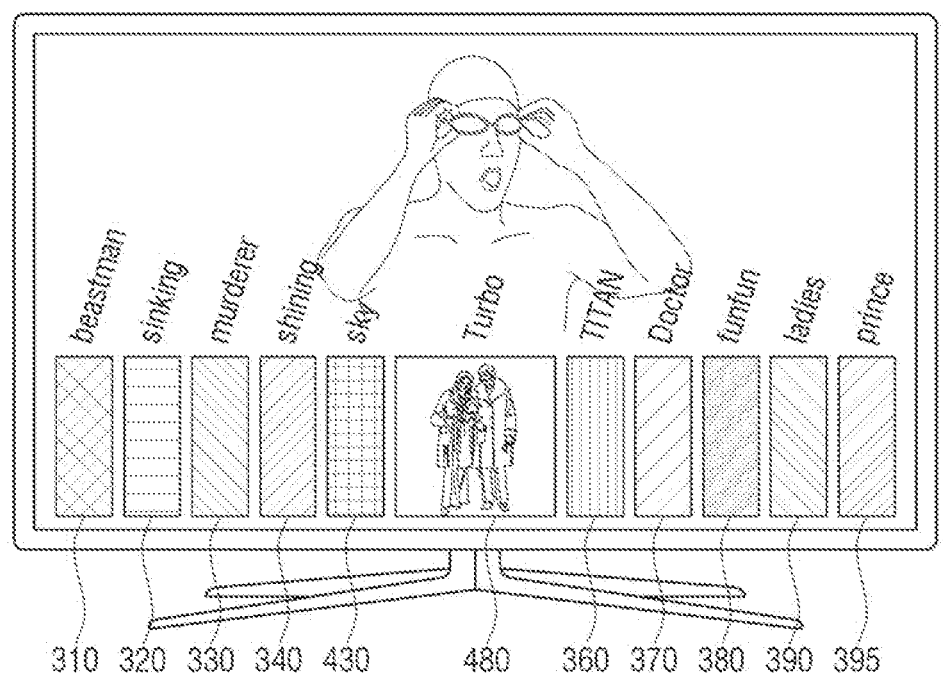

Finally, as illustrated in FIG. 7E, the central portion of the plurality of display items is changed to the thumbnail image of the "Turbo 480".

That is, the plurality of display items move from right to left to correspond to the user interaction while the highlight is changed from the "sky 300" to the thumbnail image corresponding to the "Turbo 480" by the foregoing process.

FIG. 7E illustrates the display item including five blocks at either side of the thumbnail image in addition to one thumbnail image 480, but the number of displayed display items may be different depending on the size of the display 110, the size of the display item, or the user setting.

Further, in the case in which the total number of display items is large, and thus all of the display items are not simultaneously displayed on the display 110, when the user interaction for moving the display item is input, the display items which are not displayed may be sequentially displayed while all the display items move in the direction corresponding to the input user interaction.

When there are no more display items to be displayed while the display items move by the user interaction, the display apparatus 100 may control the plurality of display items to be displayed as if the plurality of display items return to an original position with elasticity.

That is, as illustrated in FIG. 7E, the case in which a display item which is located at a right end of all the display items even including the display items which are not displayed corresponds to "prince 395" will be described as an example. In this case, when the user interaction for moving the display item from right to left is continuously input, the content displayed as the thumbnail image at the central portion of the first region of the plurality of display items is changed from the "Turbo 480" to the "TITAN 360" and a position (portion at which the "prince 395" is displayed, in FIG. 7E) corresponding to one space of a block of the rightmost portion of the plurality of display items is blank.

Further, the content displayed as the thumbnail image is changed from the "TITAN 360" to "Doctor 370" and the two rightmost positions (portions at which the "ladies 390" and the "prince 395" are displayed, in FIG. 7E) are blank.

Finally, the content displayed as the thumbnail image is the "prince 395". Further, no block is displayed to the right of the thumbnail image of the "prince 395". In this case, when the user interaction for moving the display item from right to left is sensed again, if the user interaction ends by the user behavior to take his/her finger off from the touch pad, and the like, after the thumbnail image of the "prince 395" slightly moves to the left, the display apparatus 100 may display the thumbnail image of the "prince 395" in an appearance such that the thumbnail image of the "prince 395" again returns to the first region. Therefore, the user may obtain a visual effect as if the thumbnail image of the "prince 395" returns to the position of the first region with elasticity.

Further, the display apparatus 100 may display the plurality of display items so that left ends and right ends of the plurality of display items are continued. That is, when the user interaction for moving the plurality of display items is continuously input, the display apparatus 100 may display the plurality of display items so that the plurality of display items move as though they are seamlessly connected, like a cylindrical shape.

In detail, the case in which the eleven display items illustrated in FIG. 7E are the display items corresponding to all the content available will be described as an example. When the user interaction for moving the display item from right to left is continuously input, the content displayed as the thumbnail image at the central portion which is the first region of the plurality of display items is changed from the "Turbo 480" to the "TITAN 360". Further, all the display items move to the left, and a block corresponding to the "beastman 310" located leftmost moves to the rightmost of the display 110. That is, the block corresponding to the "beastman 310" is displayed at the position of the block corresponding to the current "prince 395".

When the user interaction for moving the display item from right to left is further input, the content displayed as the thumbnail image at the central portion which is the first region of the plurality of display items is changed from the "TITAN 360" to the "Doctor 370". Further, the block corresponding to the "sinking 320" moves to the rightmost of the display 110.

That is, in FIG. 7E, when the user interaction is input twice from right to left, in which the display item located in the first region is changed, the arrangement order of all the display items becomes the "murderer 330", the "shining 340", the "sky 430", the "Turbo 480", the "TITAN 360", the "Doctor 370", the "funfun 380", the "ladies 390", the "prince 395", the "beastman 310" and the "sinking 320". Further, the "Doctor 370" located at the center is displayed as the thumbnail image. The remaining display items become a block form.

Meanwhile, the method for moving the plurality of display items as described above may be performed while the display apparatus 100 is playing other content. That is, when the foregoing user interaction is input while the display apparatus 100 displays live TV, for example, the display 110 may move and display the plurality of display items at the lower end of the display while continuously displaying live TV.

Meanwhile, when a second user interaction for extending the plurality of display items is sensed by the sensor 120, the controller 130 may display the first display item using the third display scheme and change the display scheme of the remaining display items, other than the first display item located in the first region among the plurality of display items, to the first display scheme.

That is, when the user interaction of vertically dragging on the touch pad 210, as described with reference to FIG. 5C, or the user interaction of pressing any one of the 4-way buttons 220 illustrated in FIG. 6 is sensed, the display apparatus 100 may extend the display item or change the display scheme of the display item.

The first display scheme may be displaying a thumbnail image corresponding to the display item. Further, the third display scheme may be displaying a pre-established video which is different from, and more extended than the thumbnail image. In particular, when the content corresponding to the display item is the video content, the third display scheme may be one of the plurality of frames included in the video content.

Figure 8A:
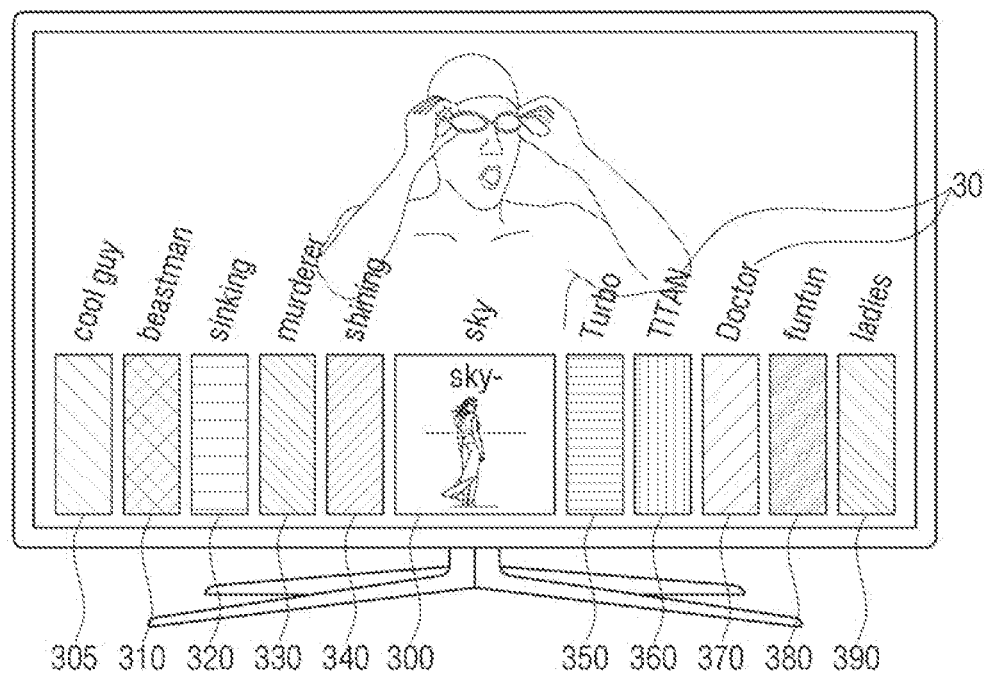
FIGS. 8A to 8H are diagrams illustrating a method for extending a plurality of display items and playing the extended items on a whole display according to an exemplary embodiment.
Figure 8B:
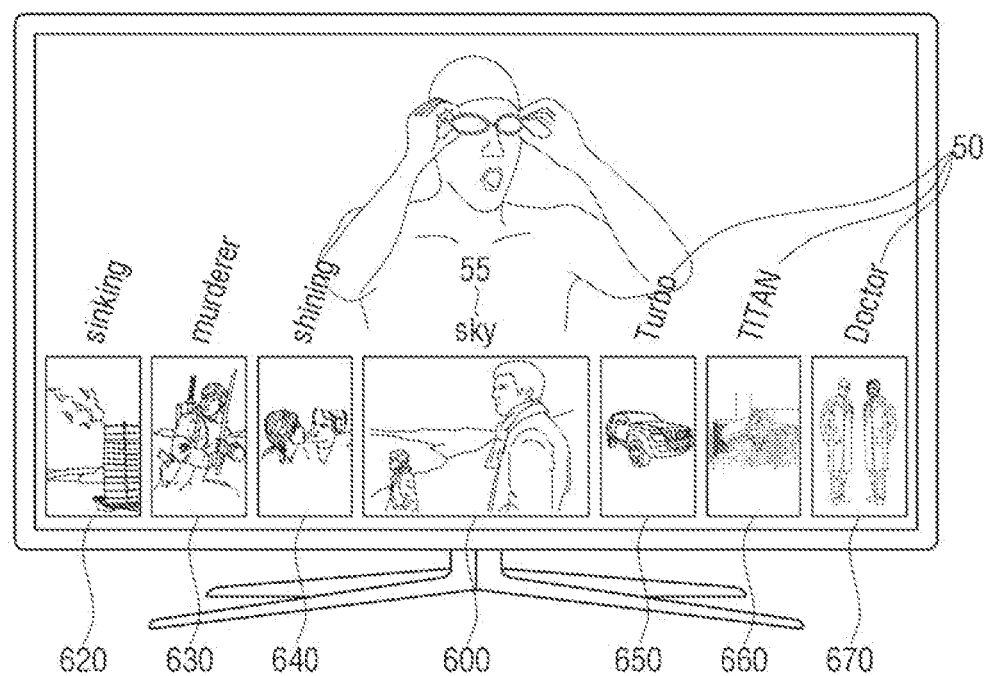

As illustrated in FIG. 8A, when the second user interaction for extending the plurality of display items is sensed in the state in which the first region corresponding to the central portion of the plurality of display items is displayed in the thumbnail image, the remaining display items are displayed in the block form, and the display apparatus 100 changes the display scheme as illustrated in FIG. 8B to display the display item.

That is, a thumbnail image 300 of the first region is changed to a pre-established video 600. Further, a name 55 of the content located in the first region may be horizontally displayed at an upper end of the pre-established video 600. A width of the pre-established video 600 is generally wider than that of the thumbnail image, and therefore the display apparatus 100 may horizontally display the content name 55 corresponding to the pre-established video 600.

The pre-established video 600 may also be a moving picture. That is, when the pre-established video 600 in the first region is displayed, and the preset time (for example, 2 seconds) elapses, the pre-established video 600 may play all the corresponding video content or a preview video.

The preview video may be directly generated by the user. Alternatively, the preview video may be generated by extracting a portion of the plurality of frames included in the content. For example, frames selected at a preset interval may be extracted to be used as the preview video.

The remaining display items, other than the first display item located in the first region, may be changed to thumbnail images 620, 630, 640, 650, 660, and 670 from the block form. While the plurality of display items are extended, the total number of displayed display items is reduced. The number of displayed thumbnail images may be different depending on the width of the display 110, the width of the display item, or the user setting.

As illustrated in FIG. 8B, when the second user interaction is continuously sensed, the display apparatus 100 may play the video content displayed in the first region. In particular, the display apparatus 100 may also play the video content from the frame displayed as the pre-established video 600 in the first region.

Figure 8C:
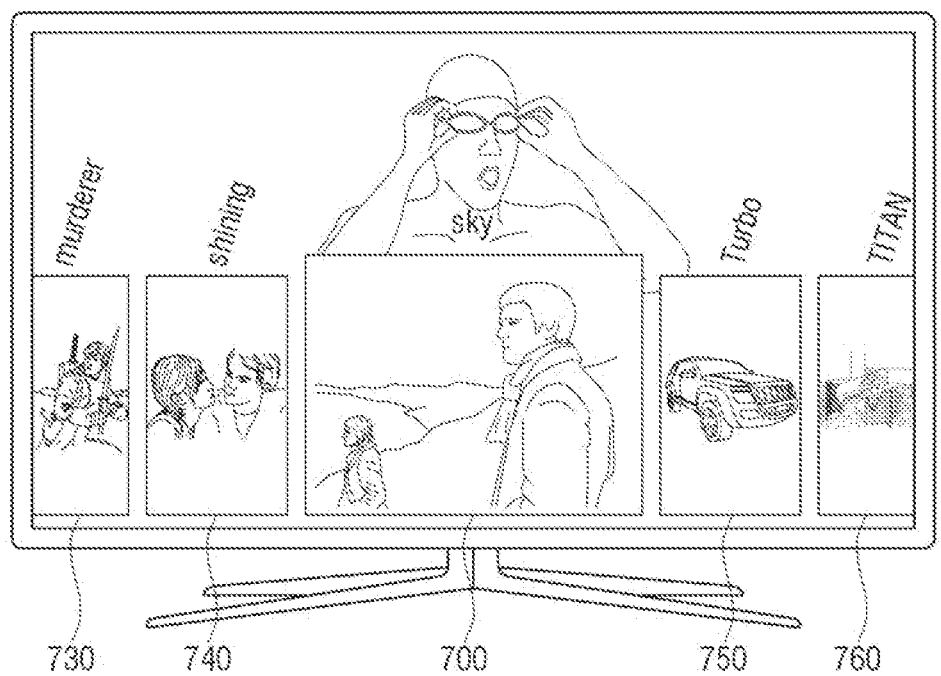
Figure 8D:
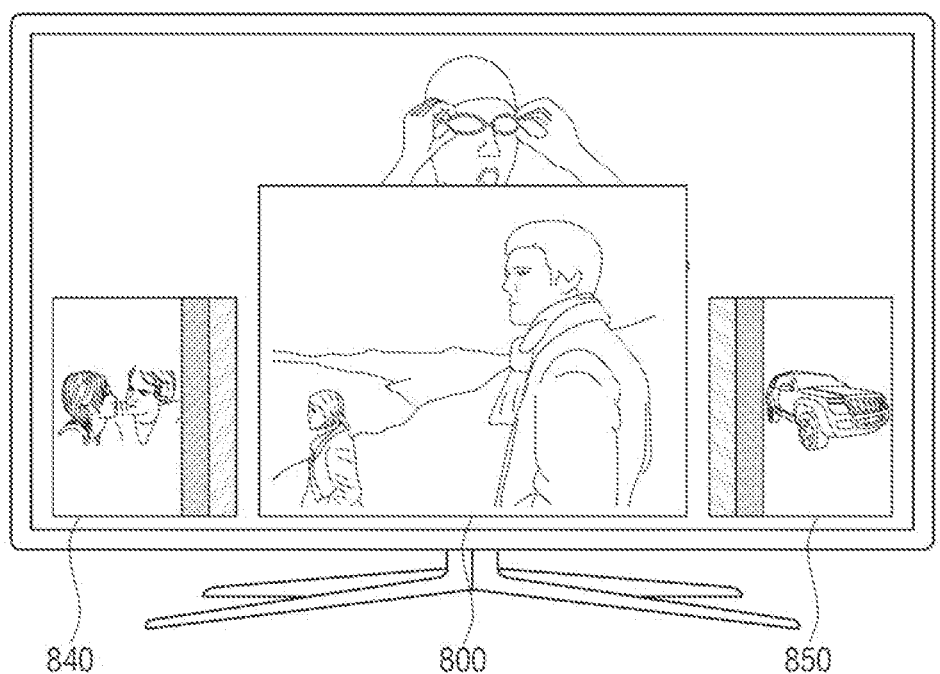
Figure 8E:
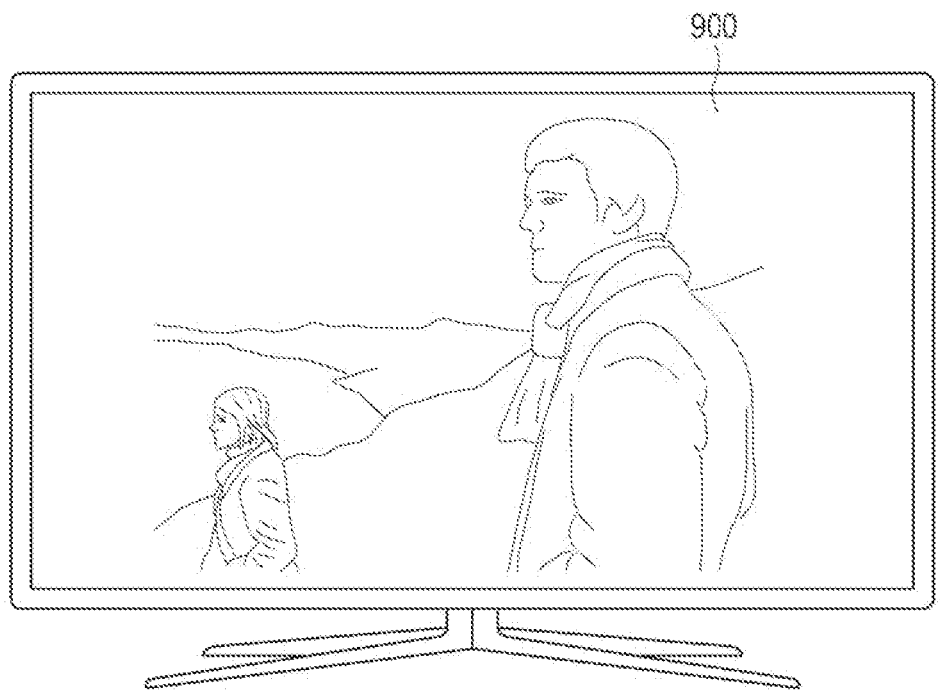

The display apparatus 100 may play the video content as illustrated in FIGS. 8C, 8D, and 8E, corresponding to the user interaction for playing the video content.

That is, as illustrated in FIG. 8C, the display item is further extended, corresponding to the user interaction.

However, as illustrated in FIG. 8C, when the sensed user interaction stops in the state in which while the display item is further extended and the pre-established video 700 displayed in the first region is slightly wider than other display items, the display item may return to an original state. That is, when the sensed user interaction stops while in the state illustrated in FIG. 8C, the display item may return to the state illustrated in FIG. 8B. Therefore, prior to sensing the user interaction which is equal to or more than the threshold value, the user may obtain the visual effect as if the display item is recovered due to elasticity.

When the user interaction which is equal to or more than the threshold value is input, as illustrated in FIG. 8D, the pre-established video 800 located in the first region is extended and the remaining display items 840 and 850 may move off of the screen to both sides, while leaving an afterimage.

Meanwhile, the method for playing the video content by extending the display item displayed by the third display scheme, as described above, may be performed while the display apparatus 100 is already playing other content. That is, when the foregoing second user interaction is input while the display apparatus 100 displays live TV, the content which is displayed by the display apparatus 100 may be changed to a content 900 corresponding to the pre-established video, as illustrated in FIG. 8E.

Further, when the user interaction for changing the playing content is input while the content 900 corresponding to the pre-established video as illustrated in FIG. 8E is displayed, the playing content may be changed depending on the displayed order of the display items.

In detail, in FIG. 8E, when the user interaction of dragging on the touch pad 210 from right to left is input, the content corresponding to the display item 650 (FIG. 8B) which is located at the right of the display item corresponding to the playing content 900 may be played.

Figure 8F:
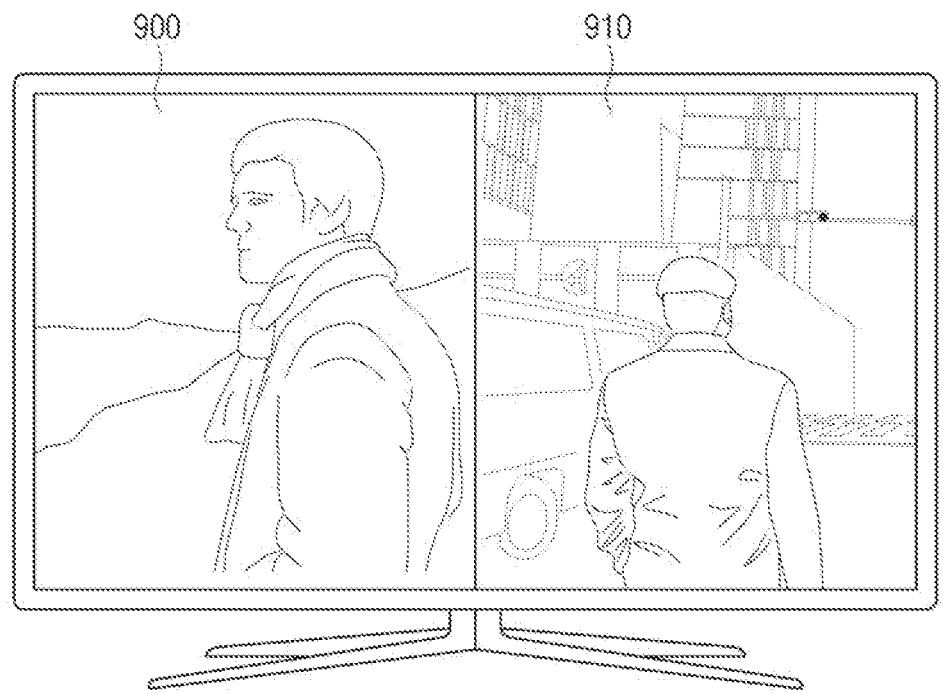

FIG. 8F is a diagram illustrating that the user interaction of dragging on the touch pad 210 from right to left is input to play another content 910, according to the exemplary embodiment.

To correspond to the user interaction, the playing video content 900 moves from right to left and another content 910 corresponding to the display item 650 (FIG. 8B) located at the right of the display item corresponding to the playing video content 900 moves from right to left.

When user interaction of dragging on the touch pad 210 from right to left stops before the content 910 corresponding to the display item 650 (FIG. 8B) located at the right of the display item corresponding to the playing content 900 is displayed on more than half of the display 110, the moving content 910 again moves from left to right and thus disappears. Further, the playing content 900 is again displayed over the whole of the display 110.

That is, when the user interaction is sensed as being less than the threshold value, the user may obtain the visual effect as if the content returns to the original positions due to elasticity.

Figure 8G:
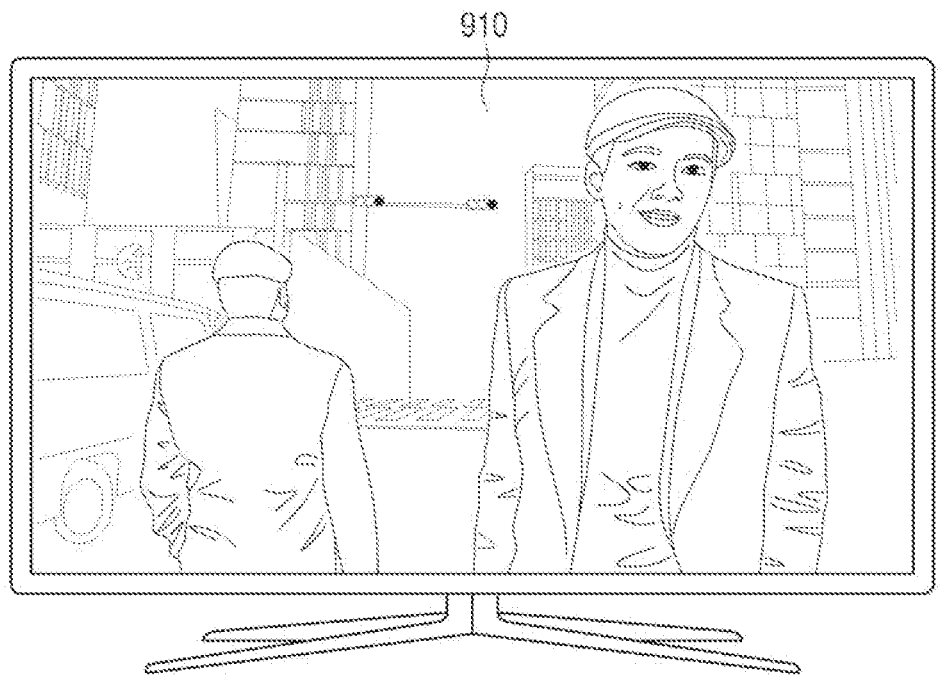

When the user interaction of dragging on the touch pad 210 from right to left is continuously input, as illustrated in FIG. 8G, another content 910 corresponding to the display item 650 (FIG. 8B) located at the right of the display item corresponding to the playing content 900 is displayed over the entire display region of the display 110.

Figure 8H:
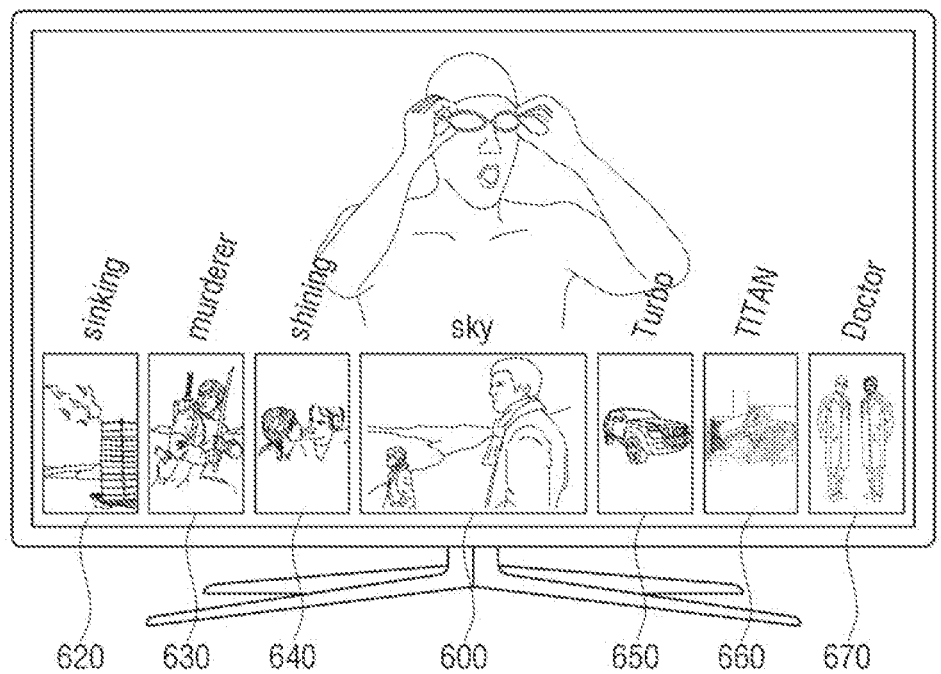
Figure 8H:
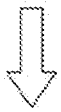
Figure 8H:
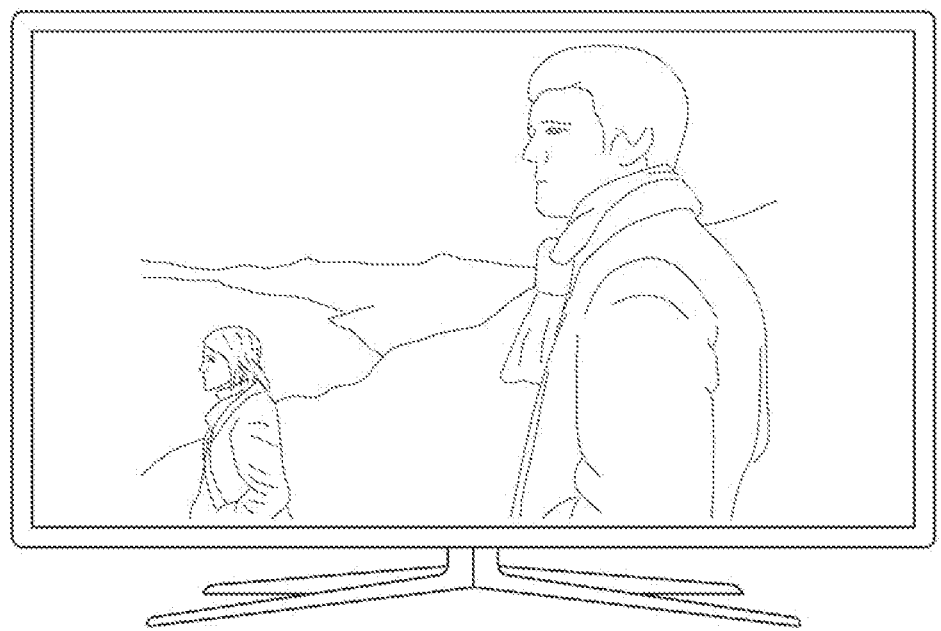

Meanwhile, as illustrated in FIG. 8H, when the user command to play the content 600 corresponding to the pre-established video is input, the display apparatus 100 may play the content 600 corresponding to the pre-established video in the entire display region of the display 110 at a time, without generally extending the plurality of display items.

For example, in the case in which the control apparatus 200 is a remote controller, the user command of pressing an "OK" button included in the control apparatus 200 is input, and the display apparatus 100 may play the content 600 corresponding to the pre-established video in the entire display region of the display 110 at a time.

Meanwhile, FIGS. 9A to 9D are diagrams for describing a method for changing the display item located in the first region in the state in which the display item is displayed as the thumbnail image and the pre-established video, according to the exemplary embodiment.

Figure 9A:
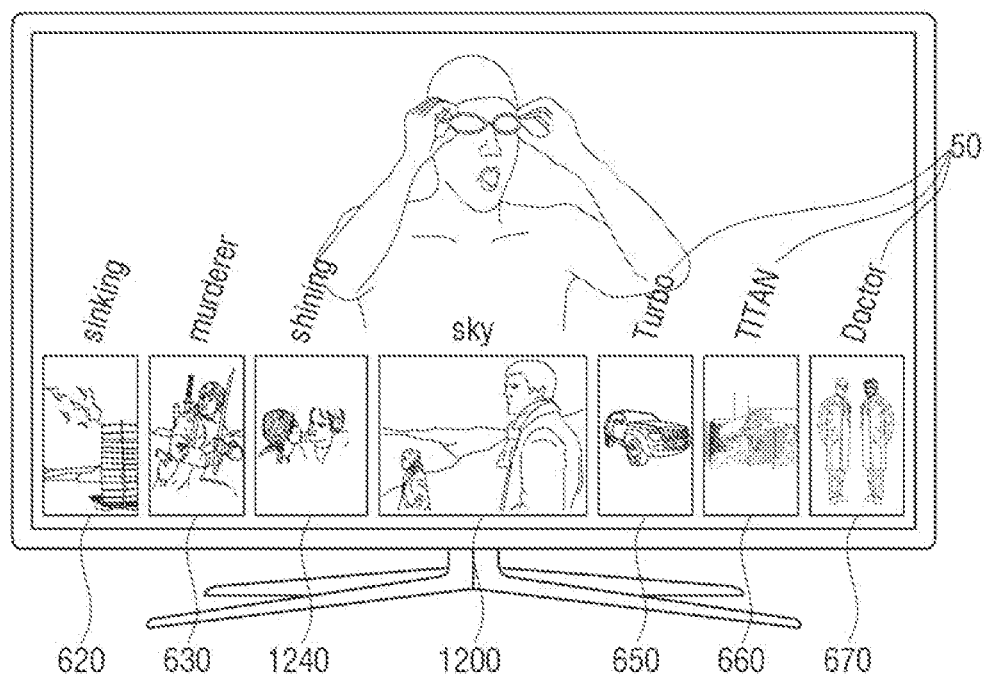
FIGS. 9A to 9D are diagrams illustrating a method for changing a display scheme while the plurality of display items move, in a state in which the display items are displayed as a thumbnail image and a pre-established video according to an exemplary embodiment.

FIG. 9A is a diagram illustrating that display items are displayed as the pre-established video 1200 in the first region of the lower end of the display 110 and displayed as thumbnail images 620, 630, 1240, 650, 660, and 670 in the remaining region other than the first region.

That is, to highlight the display item at the central portion corresponding to the first region, the display apparatus 100 may display any frame included in the video content corresponding to the display item in the first region as the pre-established video 1200.

For the remaining regions, other than the first region, the display apparatus 100 may display the display item as the thumbnail image. The thumbnail image may be an image standing for the displayed content. For example, when the plurality of displayed content is for a movie or a drama, the thumbnail image may be a poster of a movie or a drama. The thumbnail image may be stored in the storage 170. Further, the display apparatus 100 may periodically receive the thumbnail image at a preset period from an external server using wireless communication and store the received thumbnail image in the storage 170. The display apparatus 100 may receive the thumbnail image from a content provider which provides content.

The display 110 may further display a box enclosing a pre-established video 1200 as highlight.

Further, the display 110 may display names 50 corresponding to each content at an upper end of the display item. The content name 50 may be wider than the width of the thumbnail image depending on the length. Therefore, the display apparatus 100 may display the content name 50 in an inclined form. However, this is only any exemplary embodiment and the content name 50 may be omitted or may be displayed at the upper end of the thumbnail image in a horizontal direction with a small writing style.

The display apparatus 100 may sequentially display the plurality of display items corresponding to the plurality of content items depending on a genre. In this case, the display 110 may display a genre at the lower end of the display item.

For example, in FIG. 9A, when "sinking 620", "murderer 630", "shining 1240" and "sky 1200" are a thriller movie, "Turbo 650", "TITAN 660" are a horror movie, and "Doctor (670)" is a drama, the display 110 may display the "thriller" at the lower end of the display item representing the "sinking 620", the "murderer 630", the "shining 1240" and the "sky 1200" in a horizontal direction, the "horror" at the lower end of the display item representing the "Turbo 650" and the "TITAN 660" in a horizontal direction, and the "drama" at the lower end of the display item representing the "Doctor 670" in a horizontal direction.

A word representing a genre displayed at the lower end may also be displayed over the whole lower end of the display items which are included in the corresponding genre, but the number of display items which are included in each genre is generally different and therefore the display 110 may display a word representing a genre at the lower end of the display item which is located at a start portion of the genre. That is, depending on a length of a word representing a genre, the genre may be displayed over one display item or the genre may be displayed over two display items.

Meanwhile, when a user command to change an arrangement of the display items is input, the display apparatus 100 may change the arrangement of the display items depending on a newly established standard and display the changed arrangement of the display items.

For example, the display apparatus may classify the display item into a content with a bookmark established by a user, a content which is frequently played by a user, and other content and display the classified display item by the user command.

That is, as described above, in the case in which the display item is displayed depending on the "thriller", "horror", and "drama" genres, when the user command to change the arrangement of the display item depending on the preference is input, the display apparatus 100 may display the display item in an order of the content with a bookmark, the content which is frequently played by a user, and other content.

In this case, the display item located in the first region among the plurality of display items may be displayed as the pre-established video and the remaining display items may be displayed as the thumbnail image. However, instead of a genre name, such as "thriller", words such as "favorite", "frequent play", and "low play frequency" may be displayed at the lower end of the display item.

A standard to change the arrangement of the display item may be vary, for example as a kind of content, a content provider, characters appearing in content, and content providing country.

Meanwhile, when the user interaction 205 as described in FIG. 5B is sensed, the plurality of display items move in the horizontal direction. In particular, the user interaction 205 of the FIG. 5B is the user interaction of dragging touch pad from left to right, and therefore the plurality of display items may move from left to right to correspond to the direction of the sensed user interaction. That is, in FIG. 9A, the central portion may be changed from the "sky 1200" to the "shining 1240".

Further, when the user interaction of dragging on the touch pad 210 from right to left, which is an opposite direction to the user interaction 205 of FIG. 5B, is sensed, the plurality of display items may move from right to left to correspond to the direction of the sensed user interaction. That is, in FIG. 9A, the central portion may be changed from the "sky 1200" to the "Turbo 650".

Figure 9B:
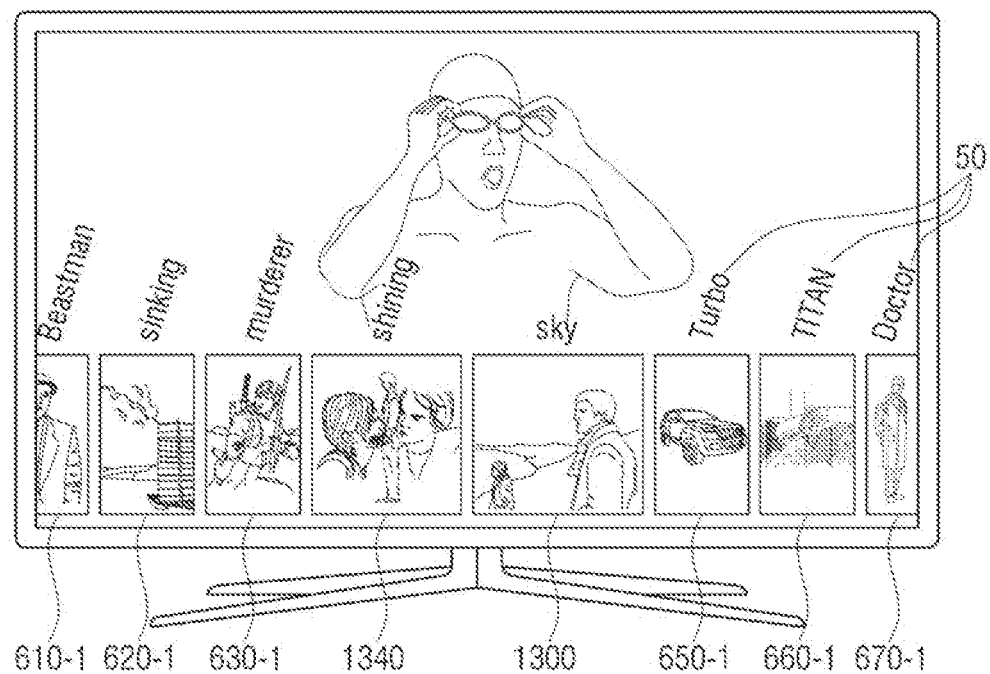
Figure 9C:
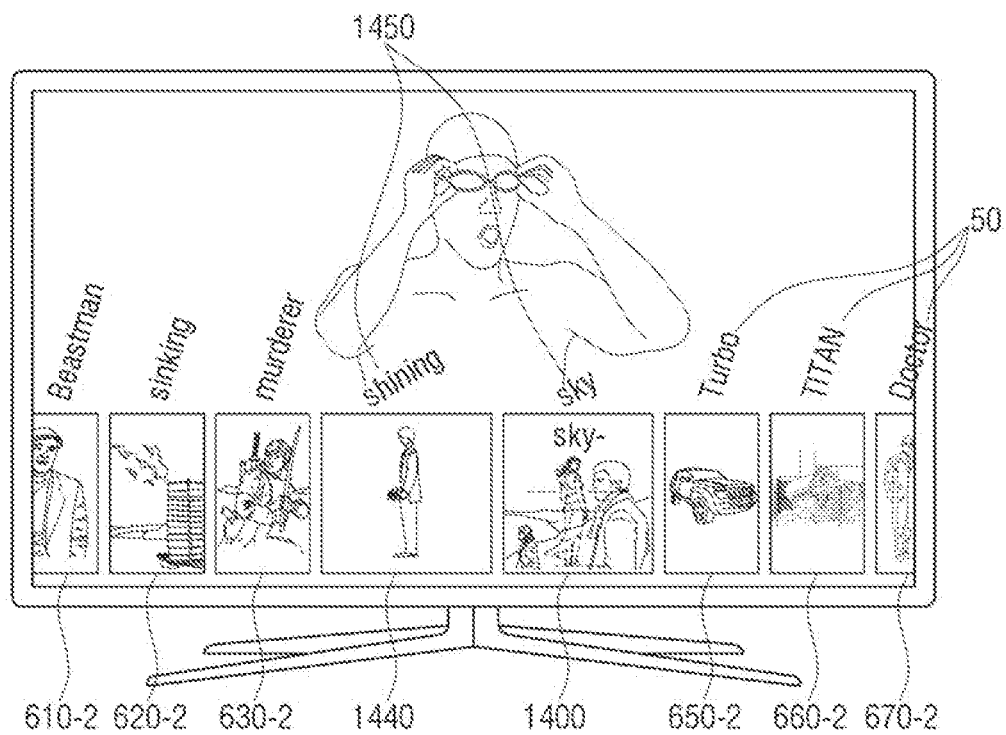
Figure 9D:
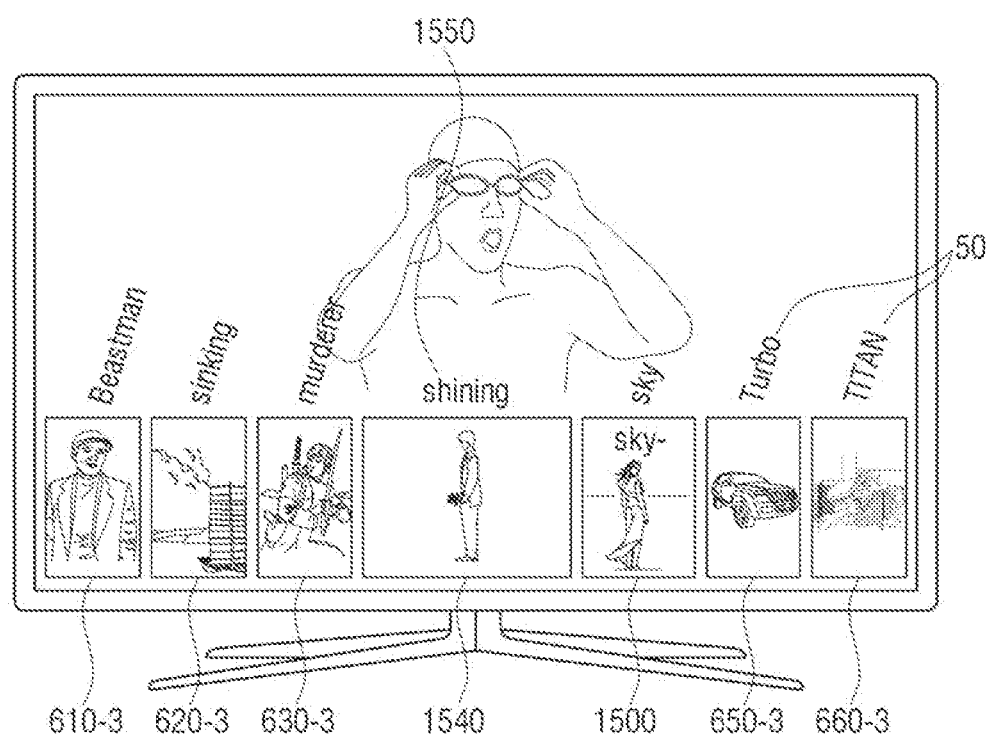

Referring to FIGS. 9B to 9D, a process of changing the highlight of the central portion of the display item from the "sky 1200" to the "shining 1240" by the user interaction 205 will be described in detail.

When the user interaction of dragging on the touch pad 210 of the control apparatus 200 from left to right is sensed, the display 110 may display a process of moving all of the display items to move from left to right. Therefore, the highlighted pre-established image of the central portion is also changed depending on the moving direction of all the display items.

First, as illustrated in FIG. 9B, the width pre-established video 1300 of the highlighted "sky" narrows as it moves from left to right by the user interaction. The width of the thumbnail image 1240 of the "shining" located at the left of the pre-established video 1300 of the "sky" is widened as the width of the pre-established video 1300 of the highlighted "sky" is narrowed.

In particular, when the width of the thumbnail image 1240 of the "shining" located at the left of the pre-established video 1300 of the "sky" is larger than the preset ratio, the display apparatus 100 may display an image 1340 in which the thumbnail image of the "shining" overlaps the pre-established video of the "shining".

For example, the display apparatus 100 may display the image 1340 in which the thumbnail image of the "shining" and the pre-established video of the "shining" overlap each other, just before the widths of the display items of the "shining" and the "sky" are the same as each other from the time when the width of the thumbnail image 1240 of the "shining" is increased to 140%.

Meanwhile, when the plurality of display items move, the content name 50, which is displayed along the upper ends of each item, is displayed so as to correspond to the movement of the display item.

In the displayed state illustrated in FIG. 9B, when the user takes his/her finger off from the touch pad 210, the display items may return to the display state of FIG. 9A as if the result of an elastic force.

When the user interaction 205 from the left of the user toward the right is continued, as illustrated in FIG. 9C, after the width of the display item 1400 corresponding to the originally highlighted "sky" is smaller than that of the display item 1440 corresponding to the "shining", the display apparatus 100 may display a video 1400 in which the thumbnail image of the "sky" and the pre-established video of the "sky" overlap each other.

For example, the display apparatus 100 may overlap the thumbnail image of the "sky 1400" with the pre-established video of the "sky 1400" until the width of the display item of the "sky 1400" becomes 140% of the thumbnail image and display the display item. Further, when the width of the display item of the "sky 1400" is reduced to less than 140% of the thumbnail image, the display apparatus 100 may display the thumbnail image of the "sky 1400".

Meanwhile, the display item 1440 corresponding to the "shining" which moves to the first region is changed to the pre-established video. Further, because the plurality of display items move from left to right, a thumbnail image 670-2 of the "Doctor" which is displayed at the right end of the display 110 gradually disappears. Further, a thumbnail image 610-2 of the "beastman" displayed at the left end of the display 110 is gradually displayed.

Finally, as illustrated in FIG. 9D, the central portion of the plurality of display items is changed to the pre-established video 1540 of the "shining".

That is, the plurality of display items move from left to right to correspond to the user interaction while the highlight is changed from the "sky" to the pre-established video 1540 of the "shining" by the foregoing process.

Therefore, the display 110 displays a pre-established video 1540 of the "shining" at the central portion of the first region and displays thumbnail images 610-3, 620-3, and 630-3 of each of the "beastman", the "sinking", and the "murderer" in the left region of the first region. Further, the display 110 displays thumbnail images 1500, 650-3, and 660-3 of the "sky", the "Turbo", and the "TITAN" to the right of the first region.

FIG. 9D illustrates displaying three thumbnail images respectively at both sides of the thumbnail image in addition to one pre-established video 1540, but the number of displayed display items may be different depending on the size of the display 110, the size of the display item, or the user setting.

Further, in the case in which the number of display item exceeds the number of items able to be displayed, when the user interaction for moving the display item is input, the display items which are not displayed may be displayed while all the display items move in the direction corresponding to the input user interaction.

When there are no more display items to be displayed while the display items move by the user interaction, the display apparatus 100 may control the plurality of display items to be displayed as if the plurality of display items return to a previous position due to elasticity.

In detail, as illustrated in FIG. 9D, the case in which the final display item is located at the left end of all the display items is the thumbnail image 610-3 of the "beastman" will be described as an example.

In this case, when the user interaction for moving the display item from left to right is continuously input, the content displayed at the central portion, which is the first region of the plurality of display items, is changed from the pre-established video 1540 of the "shining" to the pre-established video 630-3 of the "murderer" and the position (portion at which the thumbnail image 610-3 of the "beastman" is displayed in FIG. 9D) corresponding to one space of the thumbnail image of the leftmost portion of the plurality of display items is blank.

Further, the content displayed as the pre-established video is changed from "murderer 630-3" to "sinking 620-3" and a position (portion at which the thumbnail images 610-3 and 620-3 of "beastman" and "sinking" are displayed in FIG. 9D) corresponding to two spaces of the thumbnail image of the leftmost portion of the plurality of display items are blank.

Finally, the pre-established video of the "beastman 610-3" is displayed in the first region. Further, no thumbnail image is present to the left of the pre-established video of the "beastman 610-3". In this case, when the user interaction 205 for moving the display item from left to right is further input, if the sensing of the user interaction ends by user behaviors, such as slightly moving the pre-established video of the "beastman 610-3" to the right and taking his/her finger off from the touch pad, the display apparatus 100 may display the pre-established video of the "beastman 610-3" returning to the first region. Therefore, the user may obtain the visual effect as if the pre-established video of the "beastman 610-3" returns to the position of the first region due to elasticity.

Further, the display apparatus 100 may display the plurality of display items while the left ends and the right ends of the plurality of display items are continuously displayed. That is, when the user interaction for moving the plurality of display items is continuously input, the display apparatus 100 may display the plurality of display items so that the plurality of display items move as though connected seamlessly, like a cylindrical shape.

Meanwhile, the method for moving the plurality of display items as described above may be performed while the display apparatus 100 already plays other content. That is, when the foregoing user interaction is input while the display apparatus 100 displays live TV, the display 110 may display the moving content of the plurality of display items at the lower end of the display 110 while continuously displaying live TV.

Further, the pre-established video displayed in the first region may be a moving picture. Therefore, the display item corresponding to one content is displayed in the first region, and when the preset time elapses, the display apparatus 100 may play the pre-established video which is displayed in the first region. The video which is played in the first region may be the video content that corresponds to the display item corresponding to the first region. Alternatively, the video which is played in the first region may be a preview video of the video content that corresponds to the display item corresponding to the first region.

The preview video may be directly generated by the user. Alternatively, the preview video may be generated by periodically extracting a portion of the plurality of frames included in the content at a preset interval.

Meanwhile, a speed of the display of moving the display items may vary even though the user interaction of the same speed from the user is sensed. For example, the moving of the display item to left or right described with reference to FIGS. 7A to 7E and FIGS. 9A to 9D may be performed at different speeds, even though a speed of the input is the same.

That is, the controller 130 may allocate weights for a moving speed to the plurality of display items. For example, the controller 130 may perform a control to make a moving speed slow when the portion of the display item passes through the first region, and to make the moving speed fast when an interval between the display item passes through the first region.

Further, the plurality of display items may disappear depending on the user command. The user command to end display of the display items may be an input to press a separate button installed in the control apparatus 200, or an input of a long press on the touch pad 210 of the control apparatus 200.

Further, even when the user command to end display of the display items is not input, the plurality of display items may disappear when a preset time (for example, five seconds) of inactivity elapses.

By the foregoing method of moving the display item, the user may obtain a visual effect as though the display item moves while extended due to elasticity.

Hereinafter, a method for moving the category of the plurality of display items to an upper category or a lower category will be described with reference to FIGS. 10A to 10J.

Figure 10A:
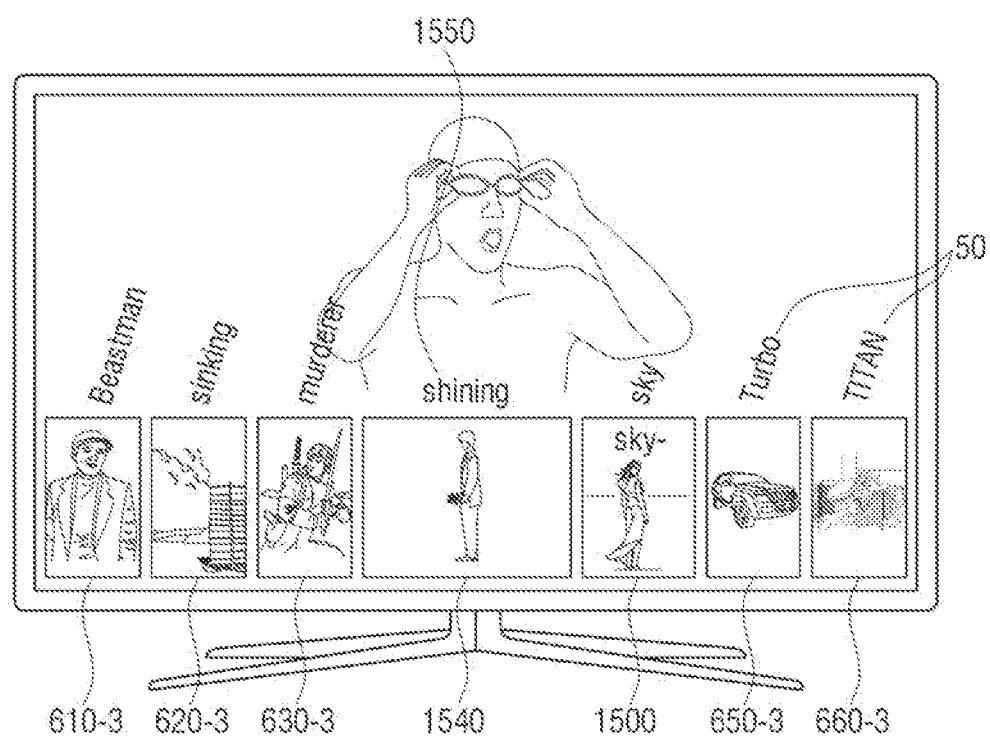
FIGS. 10A to 10J are diagrams illustrating a method for moving a category of a plurality of display items to an upper category or a lower category according to an exemplary embodiment.

As illustrated in FIG. 10A, in a case in which a display item located in the first region is displayed as the pre-established video 1540 and the thumbnail image is displayed in the remaining region, when a user interaction for reducing the display item is sensed, the plurality of display items may change to the thumbnail image and be displayed in block form.

For example, when the user interaction in the opposite direction to the second user interaction for extending the display item, the display apparatus 100 may reduce the display item and display the reduced display item.

In detail, as described above, when a command 215 dragging on the touch pad 210 of the control apparatus 200 illustrated in FIG. 5C, from a third point 215-1 to a fourth point 215-2 is the second user interaction, a user interaction for reducing the display item may be dragging on the touch pad from the fourth point 215-2 to the third point 215-1.

Figure 10B:
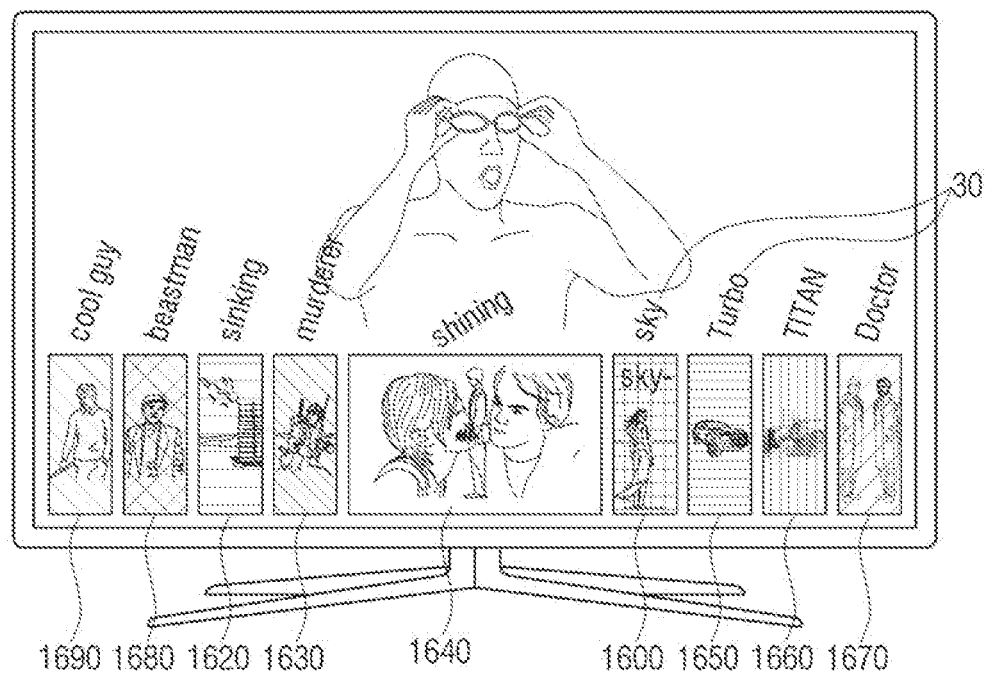

FIG. 10B is a diagram illustrating a process for reducing the display item. When a user interaction for reducing the display item is sensed, the width of the plurality of display items is narrowed.

As the width of the plurality of display items is reduced, the display item corresponding to a content "cool guy 1690" which is not displayed for the reason of space may also be displayed.

The pre-established video 1640 located in the first region is displayed, while overlapping the thumbnail image. Further, thumbnail images 1690, 1680, 1620, 1630, 1600, 1650, 1660, and 1670 located in the remaining region other than the first region overlap a color corresponding to an average value of the pixel values of each thumbnail.

Further, when the user interaction stops in the state as illustrated in FIG. 10B, the display item may return to the state illustrated in FIG. 10A. That is, when the user interaction is not sensed for more than the threshold value of time, the display item may return to the original state due to elasticity.

Figure 10C:
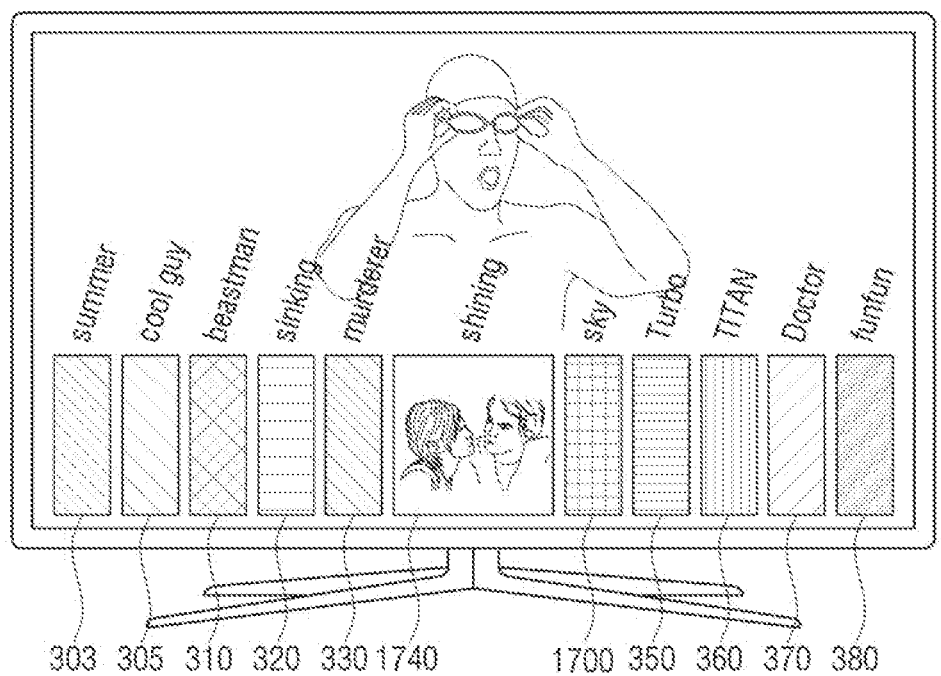

FIG. 10C is a diagram illustrating that the user interaction for reducing the display item is sensed for more than the threshold value of time, and thus the thumbnail image and the display item having the block form are displayed.

When a third user interaction is sensed in the state illustrated in FIG. 10C, the controller 130 may change the category of the display item and display the changed display item. That is, the display items are combined and thus the upper display item corresponding to the upper category may be displayed. The user interaction for changing the display item to the display item corresponding to the upper category may be the same as the user interaction for reducing the display item.

However, this is only an example, and the third user interaction for changing the display item to the display item corresponding to the upper category may be entirely different from the first and second user interactions.

For example, when the control apparatus 200 includes touch pad 210, the third user interaction may be the user command dragging on the touch pad 210 in one direction. When the control apparatus 200 includes 4-way buttons 220, the third user interaction may be the user command pressing one of the 4-way buttons 220.

When the control apparatus 200 is the pointing remote controller, the third user interaction may also be a user inclining the pointing remote controller in one direction. Alternatively, the control apparatus 200 may be a pointing remote controller including touch pad 210. In this case, the third user interaction may be a user controlling an incline angle of the slope of the control apparatus 200 together with the touch input through the touch pad 210.

Alternatively, the touch through the touch pad 210 is a user selecting any content, and the like, and the user tilting the control apparatus 200 may be a command to move a pointer. Further, tilting the control apparatus 200 together with the touch input may be the third or fourth user interaction for controlling a depth of the category. The depth of the category may be stepwise controlled depending on the slope of the control apparatus 200. Further, a speed of controlling the depth of the category may be different depending on a speed of tilting the control apparatus 200.

When the third user interaction is sensed by the sensor 120, the display apparatus 100 may combine the display items included in the same category and change the combined display items to the upper display item.

That is, the display apparatus 100 may change the display schemes of the first display item and at least one display item included in the same category as the first display item to the second display scheme, and combine the display items included in the same category in the remaining display items which are not changed to the second display scheme, and change the combined display items to the upper display item.

In FIG. 10C, the case in which the genre of "summer 303", "cool guy 305" and "beastman 310" is a mystery movie, the genre of "sinking 320", "murderer 330", "shining 1740", and "sky 1700" is a thriller movie, the genre of "Turbo 350" and "TITAN 360" is a horror movie, and the genre of the "Doctor 370" and "funfun 380" is a drama will be described as an example.

Figure 10D:
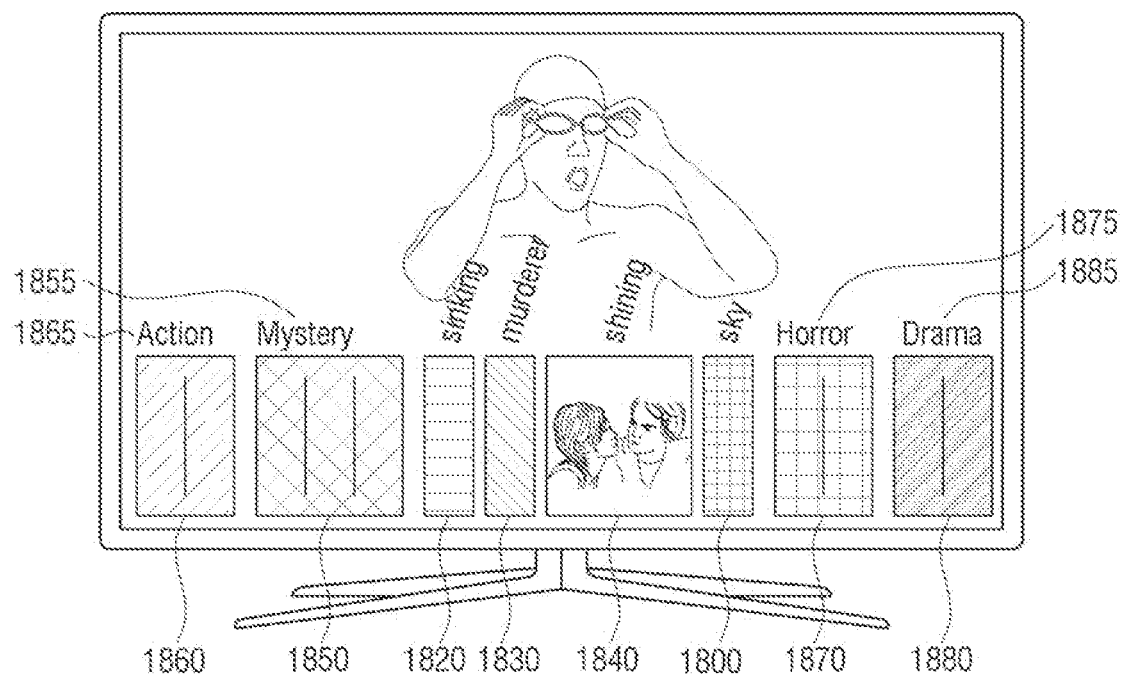

FIG. 10D is a diagram illustrating a process of combining the display items as the upper display item in response to the third user interaction.

When the third user interaction is sensed, display items corresponding to the same category are combined as one of the upper display items 1860, 1850, 1870, and 1880. On the other hand, the first display item 1840 corresponding to the first region, and display items 1820, 1830, and 1800 corresponding to the same category as the first display item 1840, the width of the display item and the interval of each display item are narrow.

The upper display items 1860, 1850, 1870, and 1880 may have different widths in proportion to the number of content items included in the corresponding category and may have a box form having a color of a plurality of colors depending on the color value of the thumbnail image of the content included in the corresponding category.

Further, during the process of combining as the upper display items 1860, 1850, 1870, and 1880, a vertical line may be included to naturally display an appearance that the display items in the block form are combined.

Further, the controller 130 may display genre names 1865, 1855, 1875, and 1885 corresponding to each upper display item at upper or lower end of each of upper display items 1860, 1850, 1870, and 1880.

Meanwhile, in addition to the display item displayed by the display 110, a display item which is not currently displayed is still present, the upper display item of the display item which is not displayed may be displayed while the upper display item is displayed by the third user interaction. That is, the space of the display 110 is insufficient to display all display items, and thus the display item not currently displayed may also be displayed as much as the allowable space of the display 110 while being changed to the upper display item.

For example, when a content of an action genre which is not currently displayed is present at the left of the display item 303 corresponding to the content "summer", the upper display item 1860 with which the display items corresponding to the action genre are combined may be displayed at the left of the upper display item 1850 corresponding to the mystery genre. Further, the genre name "action 1865" may be displayed at an upper end of the upper display item 1860 of the action genre.

Figure 10E:
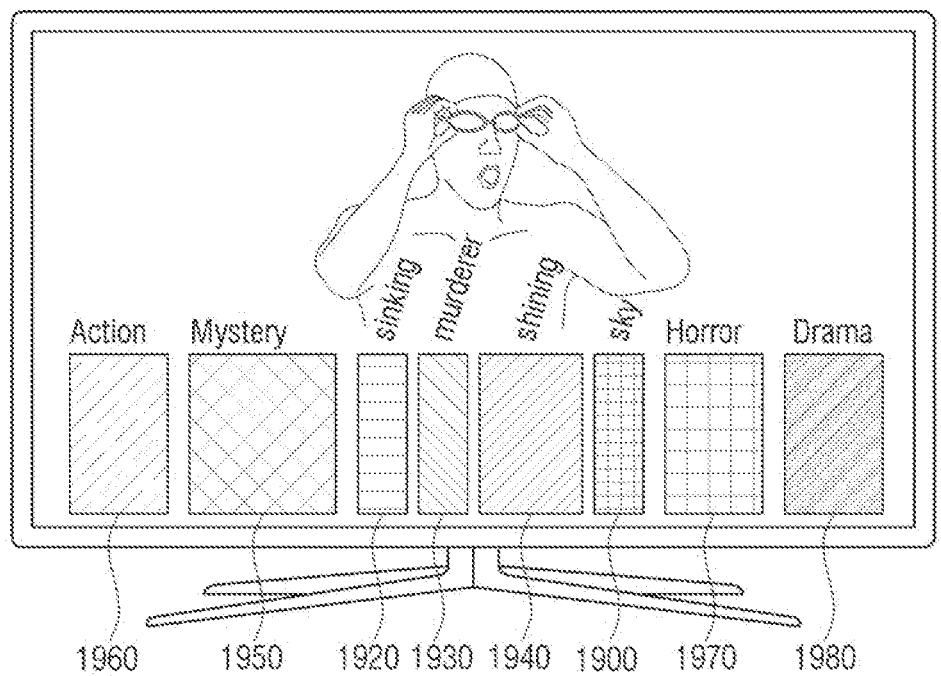

When the third user interaction is sensed more than a threshold value number of times, as illustrated in FIG. 10E, vertical lines, which are presented in upper display items 1960, 1950, 1970, and 1980, disappear.

Further, the controller 130 may change the first display item 1940 and the display items 1920, 1930, and 1900 corresponding to the content included in the same category as the first display item to a block form having a constant color. The display items 1920, 1930, 1940, and 1900 in the block form which are located in the first region may be represented by a color corresponding to an average value of the pixel values of the thumbnail images corresponding to each display item.

Figure 10F:
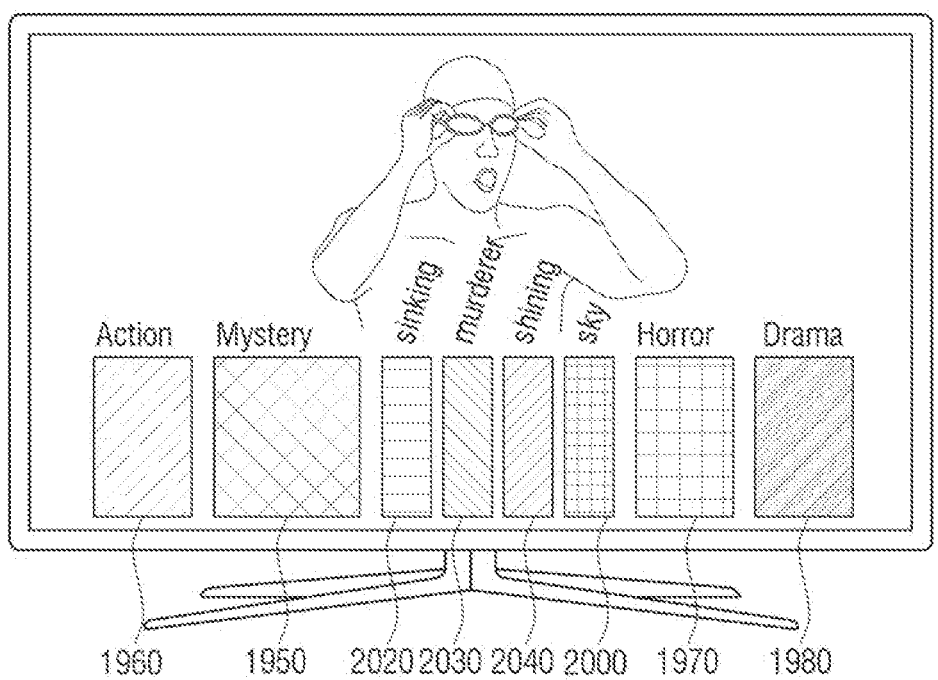

As illustrated in FIG. 10F, widths of a first display item 2040 and display items 2020, 2030, and 2000 corresponding to the content included in the same category as the first display item are the same.

Further, as illustrated in FIGS. 10G to 10J, the display items having the same width are combined in a box form.

Figure 10G:
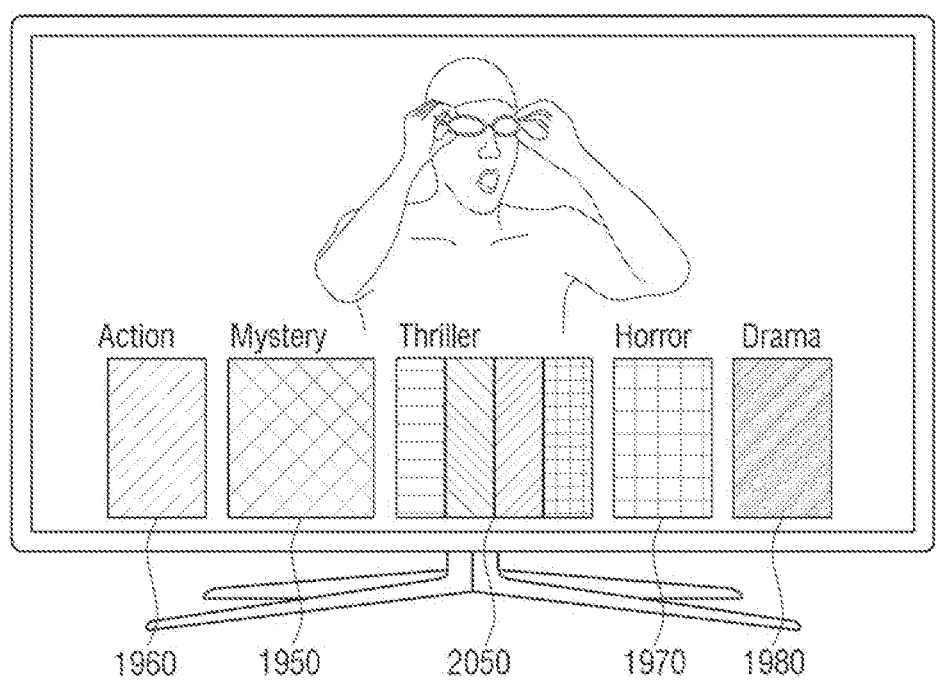

In detail, FIG. 10G is a diagram illustrating that the display items 1920, 1930, 1940, and 1900 in the block form having different colors are combined seamlessly but different colors are maintained as before. Because the display items 1920, 1930, 1940, and 1900 in the block form are combined with each other, the content names corresponding to the each block disappear. Further, the name of genre corresponding to the displayed content, for example, "thriller" is displayed.

Figure 10H:
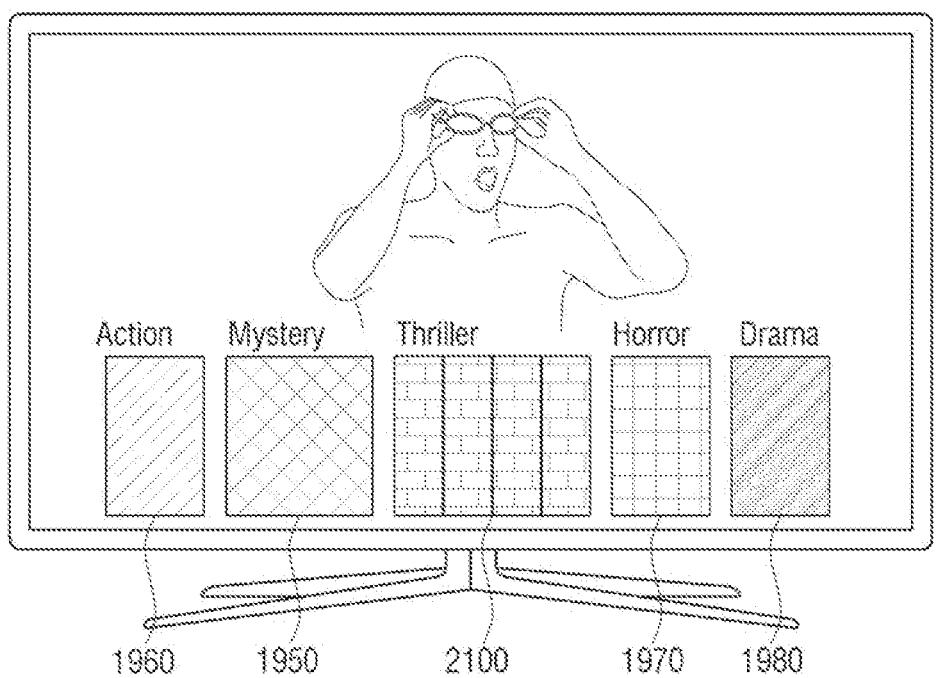

FIG. 10H is a diagram illustrating wherein the combined upper display item 2100 includes a vertical line, but a color is changed to a color having the average value of the pixel values of the color of the display item in the existing block form.

Figure 10I:
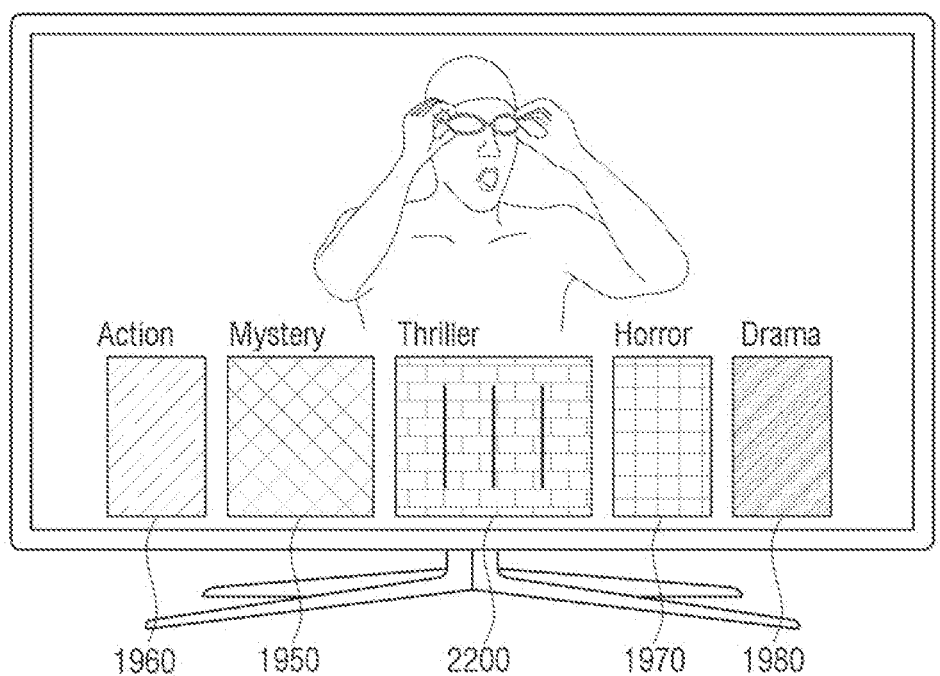
Figure 10J:
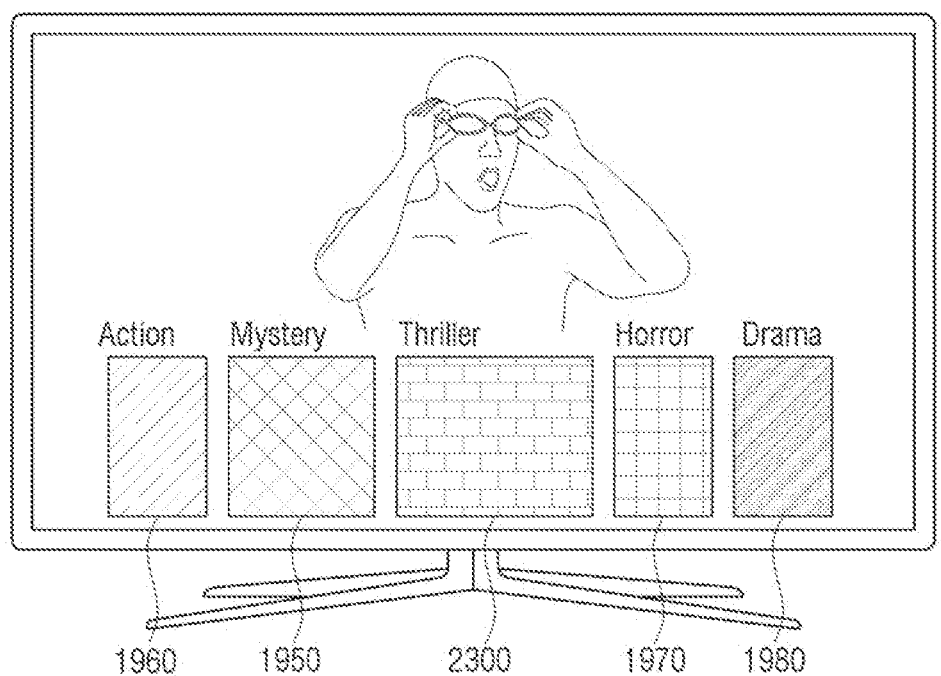

As illustrated in FIG. 10I, the vertical line included in the upper display item 220 is gradually reduced, and as illustrated in FIG. 10J, the vertical line disappears.

That is, by the method for combining the display items 2020, 2030, 2040, and 2000 included in the same category as the upper display item depending on an order as illustrated in FIGS. 10F to 10J, the user may obtain the visual effect as if the display item is continuously naturally combined as the upper display item.

In particular, when the user changes the display item to the upper display item using the remote controller or the pointing remote controller in which the touch panel 210 is included, the user may use a user interface which easily moves between categories.

Further, the method for displaying the upper display item by the foregoing process is only an example, and any step may be omitted or a step for making a display effect natural may be added.

Figure 11:
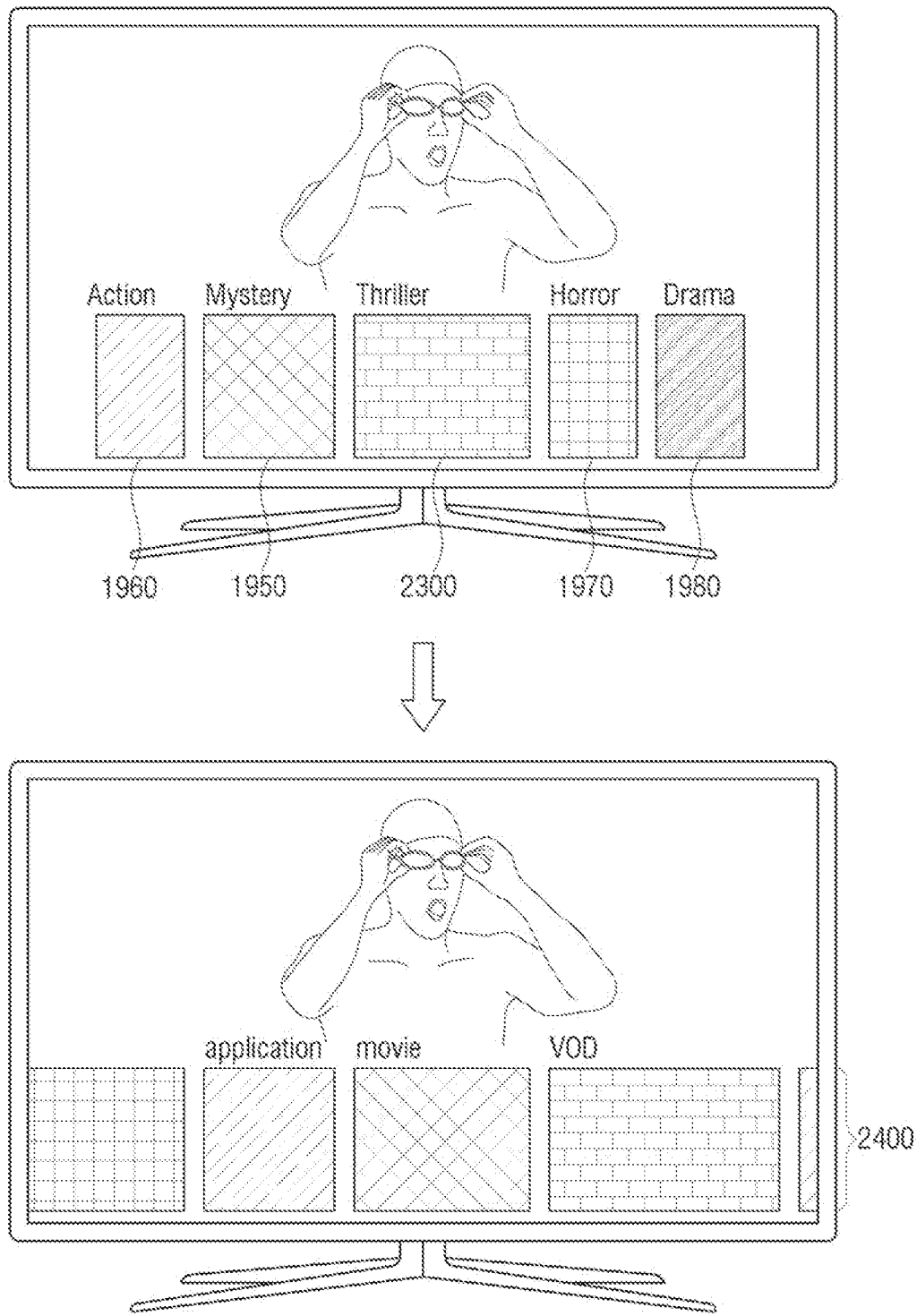
FIG. 11 is a diagram illustrating a method for changing a scheme of classifying a category of display items according to an exemplary embodiment.

Meanwhile, FIG. 11 is a diagram illustrating a method for changing a scheme of classifying the categories of the display item.

When the user command for changing the classification of the category of the display item is input, the display apparatus 100 may change a standard of classifying the category depending on the user setting, the initial setting, or the like.

For example, FIG. 11 is a diagram illustrating the display apparatus 100 in which the upper display item may be classified into "action 1960", "mystery 1950", "thriller 2300", "honor 1970" and "drama 1980" depending on the genre of the video content, such as a movie and a drama, and is displayed.

The width of the upper display item may vary depending on the number of content items. Therefore, the upper display item may be displayed at the central portion of the lower end of the display 110 depending on the width of the display 110 or the number of content items. However, this is only an example, and when the number of content items is large, the plurality of upper display items may not be displayed on the display 110 at a same time. In this case, when the user interaction for moving the display item is sensed, the upper display item may move in one direction.

The upper display item in which the video content, such as a movie and a drama are classified depending on the genre, is displayed, and when the user interaction for categorizing and displaying all the content of the display apparatus 100 is sensed, the upper display item, such as reference numeral 2400, may be arranged.

That is, the display apparatus 100 may display the upper display items 2400 including the upper display item representing "application", the upper display item representing a "movie", the upper display item representing a video on demand ("VOD"), and the like.

The upper display item, such as reference numeral 2400, may be a box form having a color and width depending on the number of content items included in the display item.

Further, the upper display item may move in one direction depending on the user interaction for moving the upper display item.

Rearranging the upper display items and classifying the video content, such as a movie and a drama depending on the genre into the upper display items and classifying all the content items of the display apparatus 100 depending on the category is only an example. Therefore the upper display items may be rearranged depending on various standards, such as rearranging upper display items depending on a content use frequency, a content provider, characters, and providing countries.

Figure 12A:
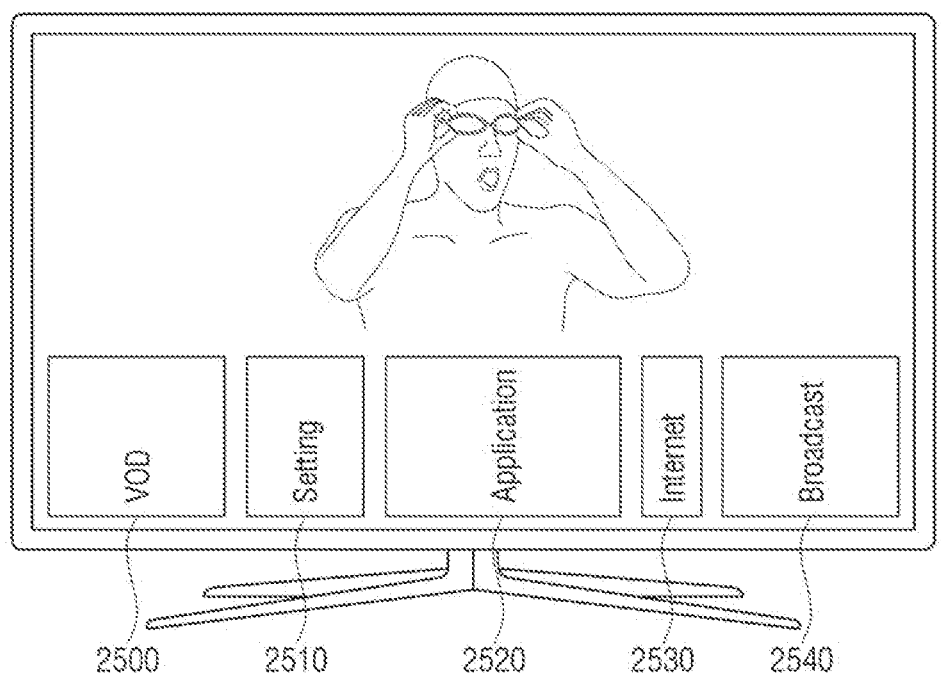
FIGS. 12A to 12C are diagrams illustrating a method for moving to a lower category of any of all menus of a display apparatus according to an exemplary embodiment.

Meanwhile, FIG. 12A is a diagram illustrating the display apparatus 100 displaying upper display items which are arranged to include content corresponding to "VOD 2500", "Setting 2510", "application 2520", "Internet 2530" and "Broadcast 2540".

Each upper display item may be represented by a different color, but as illustrated in FIG. 12A, the upper display items may also have names representing each upper display item provided therein. Further, according to the exemplary embodiment, the names of each upper display item may also be displayed at one of the upper end, left end, or right end of the upper display item.

Hereinafter, a method for displaying a lower category of an upper display item will be described with reference to FIGS. 12A to 12C.

A user interaction in the opposite direction to the third user interaction for displaying the upper category of the display item may be sensed as a fourth user interaction for displaying the lower category.

When the fourth user interaction is sensed, the display apparatus 100 may segment the upper display item corresponding to the first region and display the segmented upper display item.

For example, when the first region is a region corresponding to the center of the plurality of display items, in FIG. 12A, the upper display item 2520 corresponding to the "application" is located in the first region.

Therefore, the controller 130 may segment the upper display item 2520 corresponding to the "application", depending on the fourth user interaction.

Figure 12B:
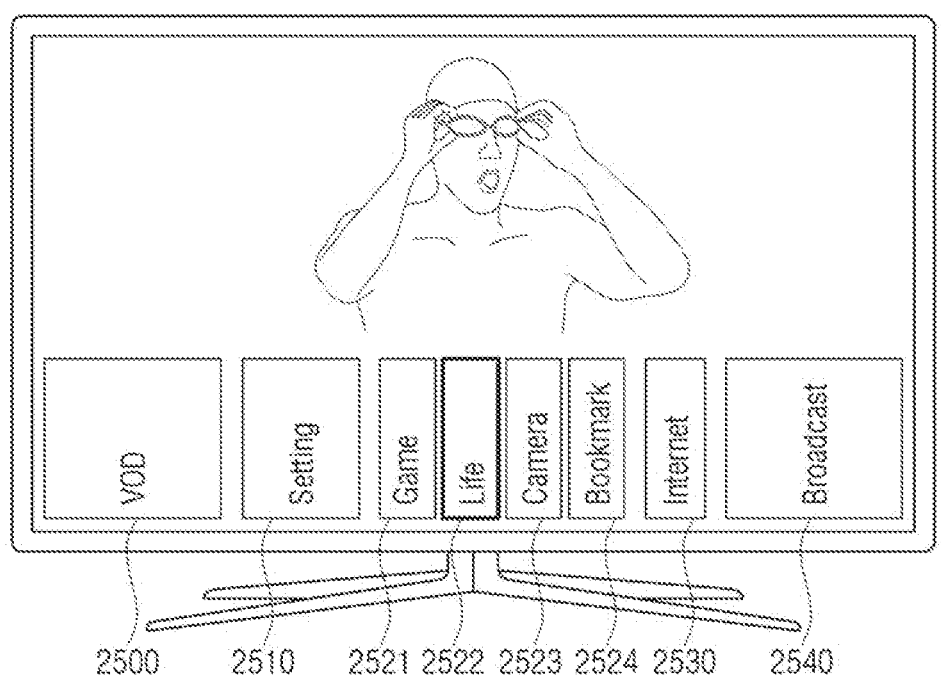

In detail, as illustrated in FIG. 12B, the upper display item 2520 corresponding to the "application" may be segmented into display items 2521, 2522, 2523, and 2524 corresponding to "Game", "Camera", "Life", and "Bookmark" categories.

As the upper display item 2520 corresponding to the "application" is segmented, the positions of the remaining upper display items 2500, 2510, 2530, and 2540 may be changed. Further, when a large number of display items are generated while the upper display item 2520 corresponding to the "application" is segmented, some or all of the remaining upper display items 2500, 2510, 2530, and 2540 may not be displayed on the display 110.

Figure 12C:
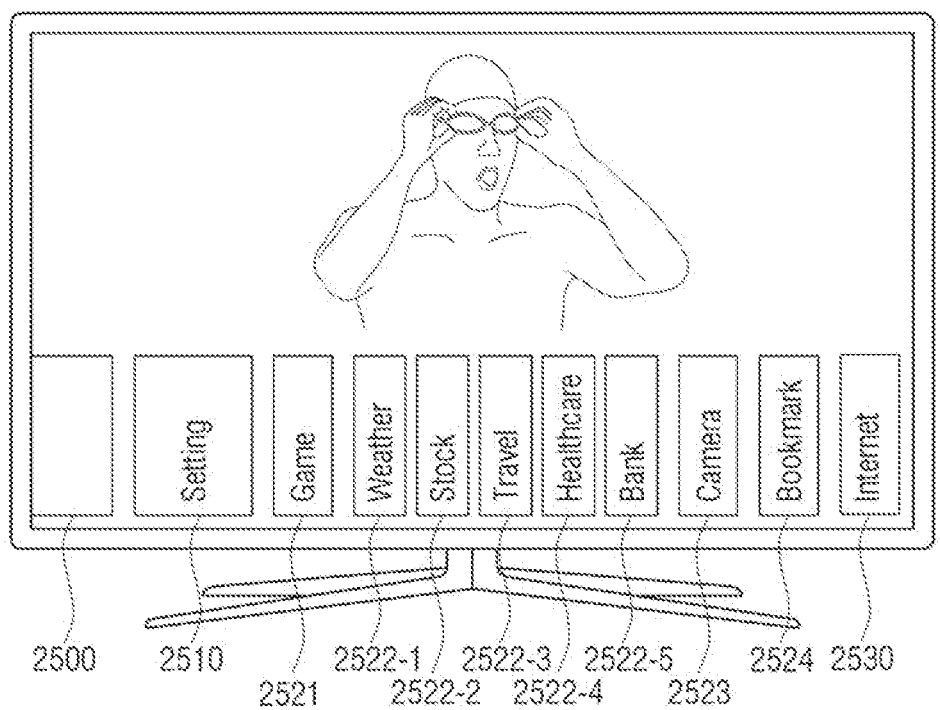

FIG. 12C is a diagram illustrating that when the fourth user interaction is sensed again, the display item 2523 corresponding to the "Life" located in the first region may be further segmented.

That is, when the fourth user interaction is sensed again, the content corresponding to the display item located at the central portion of the display item corresponding to the first region may be segmented into the lower category.

The display apparatus 100 displays a thick edge of the display item corresponding to the first region, and as a result, when the fourth user interaction is again sensed, the user may appreciate the segmentation of the display item.

In detail, when the fourth user interaction is sensed again, the display item 2523 corresponding to the "Life" is segmented, and thus lower display items 2522-1, 2522-2, 2522-3, 2522-4, and 2522-5, corresponding to "Weather", "Stock", "Travel", "Healthcare", and "Bank", may be displayed.

When the user command to execute the content is input, the display apparatus 100 may execute a content corresponding to the display item located in the first region among the plurality of displayed display items.

That is, the user interaction for moving the display item is used to execute content corresponding to the display item located in the first region and when the user command to execute the content is input, the content corresponding to the display item located in the first region is executed.

Figure 13A:
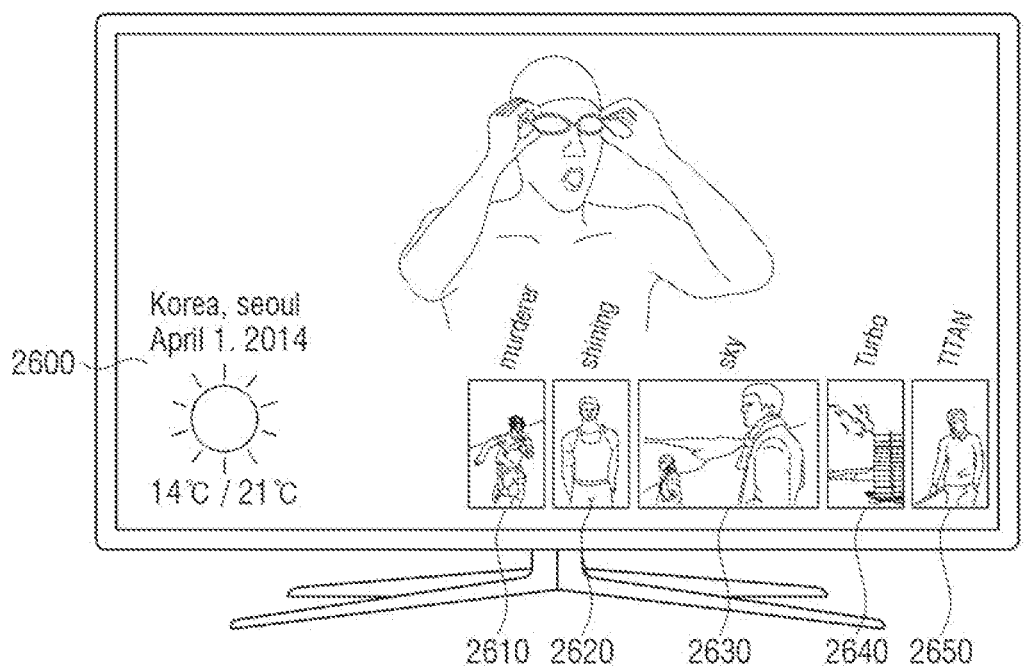
FIGS. 13A and 13B are diagrams illustrating an initial screen when a user command for displaying a plurality of display items is input according to an exemplary embodiment.
Figure 13B:
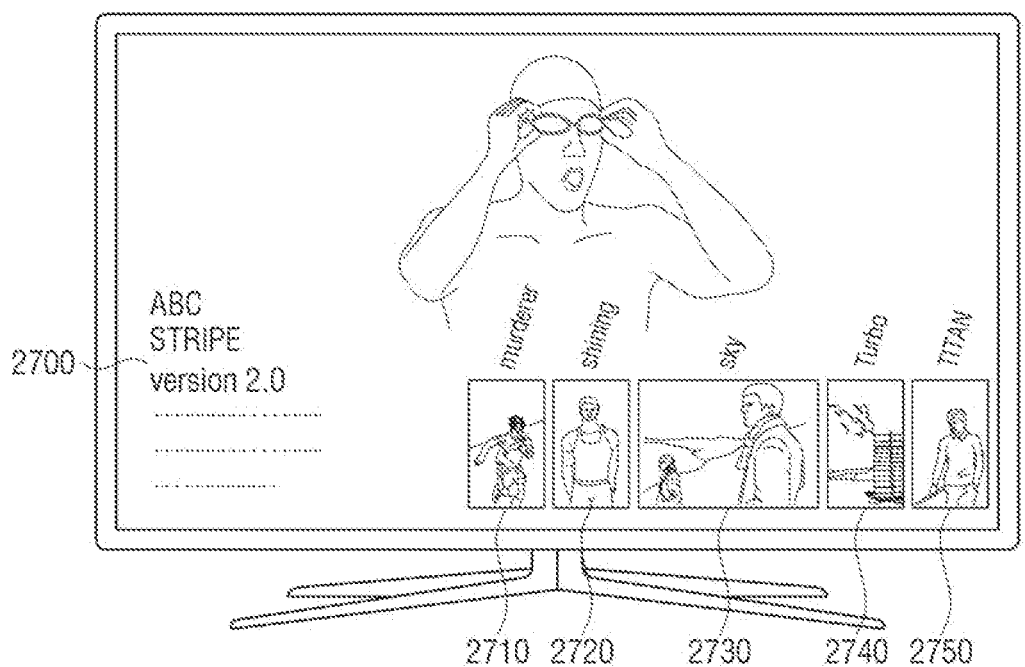

Meanwhile, when the user command to display the foregoing plurality of display items is input, the display apparatus 100 may display an initial screen, as illustrated in FIG. 13A or 13B.

That is, as illustrated in FIG. 13A, the display apparatus 100 may display a graphical user interface (GUI) 2600 which represents local, date, and weather using the display apparatus 100.

Alternatively, as illustrated in FIG. 13B, the display apparatus 100 may display a graphical user interface (GUI) 2700 which represents a name (ABC STRIPE), version information, and the like, of a program which displays the plurality of display items.

Meanwhile, when the user interaction for moving the plurality of display items is sensed while the initial screen, as illustrated in FIG. 13A or 13B, is displayed, the display apparatus 100 may display a plurality of display items at the lower end of the display 110 while the foregoing GUIs 2600 and 2700 of the initial screen disappear.

When the initial screen is displayed as illustrated in FIG. 13A or 13B and the user interaction is not sensed for a preset time (for example, 5 seconds), the display apparatus 100 may make the plurality of display items disappear from the display 110.

Figure 14:
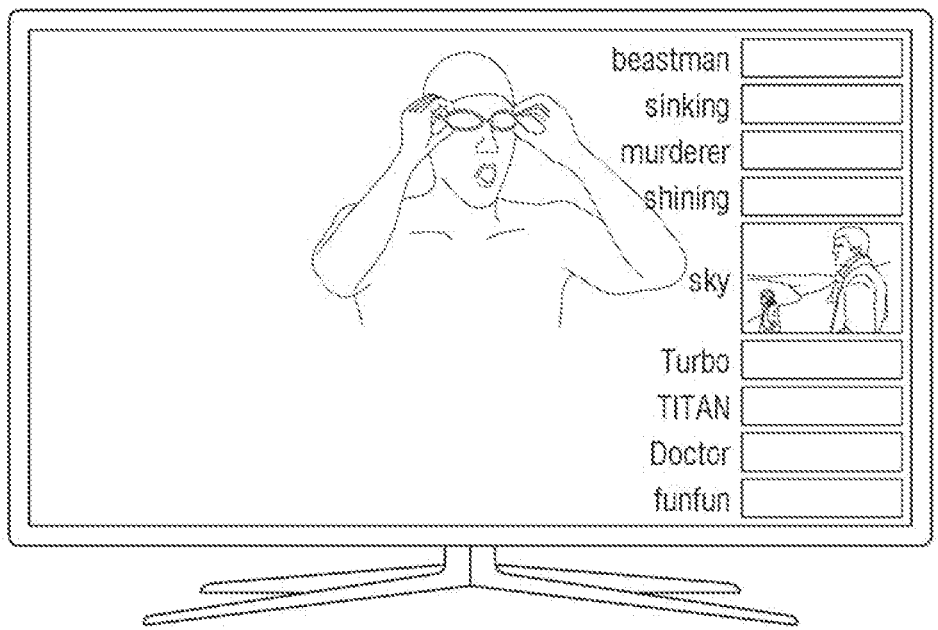
FIGS. 14 and 15 are diagrams illustrating a method for displaying a plurality of display items according to an exemplary embodiment.
Figure 15:
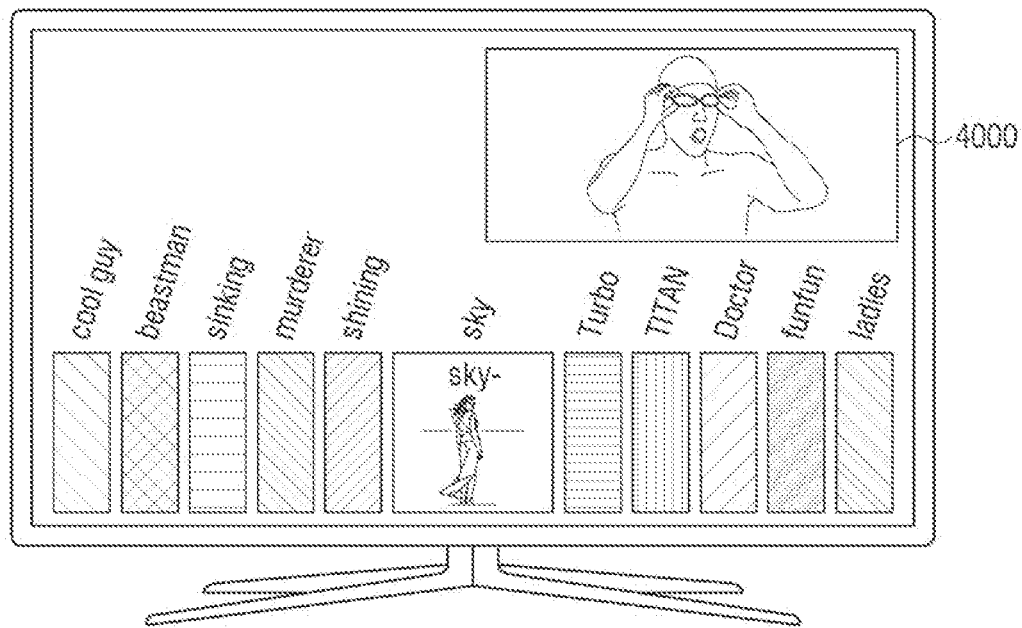

Meanwhile, FIGS. 14 and 15 are diagrams illustrating a method for displaying a plurality of display items.

That is, as described above, the plurality of display items may be displayed at the lower end of the display 110 but the plurality of display items may also be displayed at a position as illustrated in FIGS. 14 and 15.

In detail, FIG. 14 is a diagram illustrating an exemplary embodiment in which the plurality of display items are displayed at the right of the display 110 in a vertical direction. Further, this is only an example and the display apparatus 100 may display the plurality of display items at the left of the display 110 in a vertical direction.

Alternatively, as illustrated in FIG. 15, the display apparatus 100 may display the video which is displayed over the whole display 110 at a portion 4000 of the display 110 prior to displaying the plurality of display items.

That is, the display apparatus 100 may display the video which is displayed over the whole display 110 so as not to overlap the plurality of display items. This enables a video originally watched by the user to not be covered by the plurality of display items.

The user may easily search for the content or the menu and confirm the classified category by the method for controlling a depth of a category for the plurality of display items displayed as described above.

Figure 16:
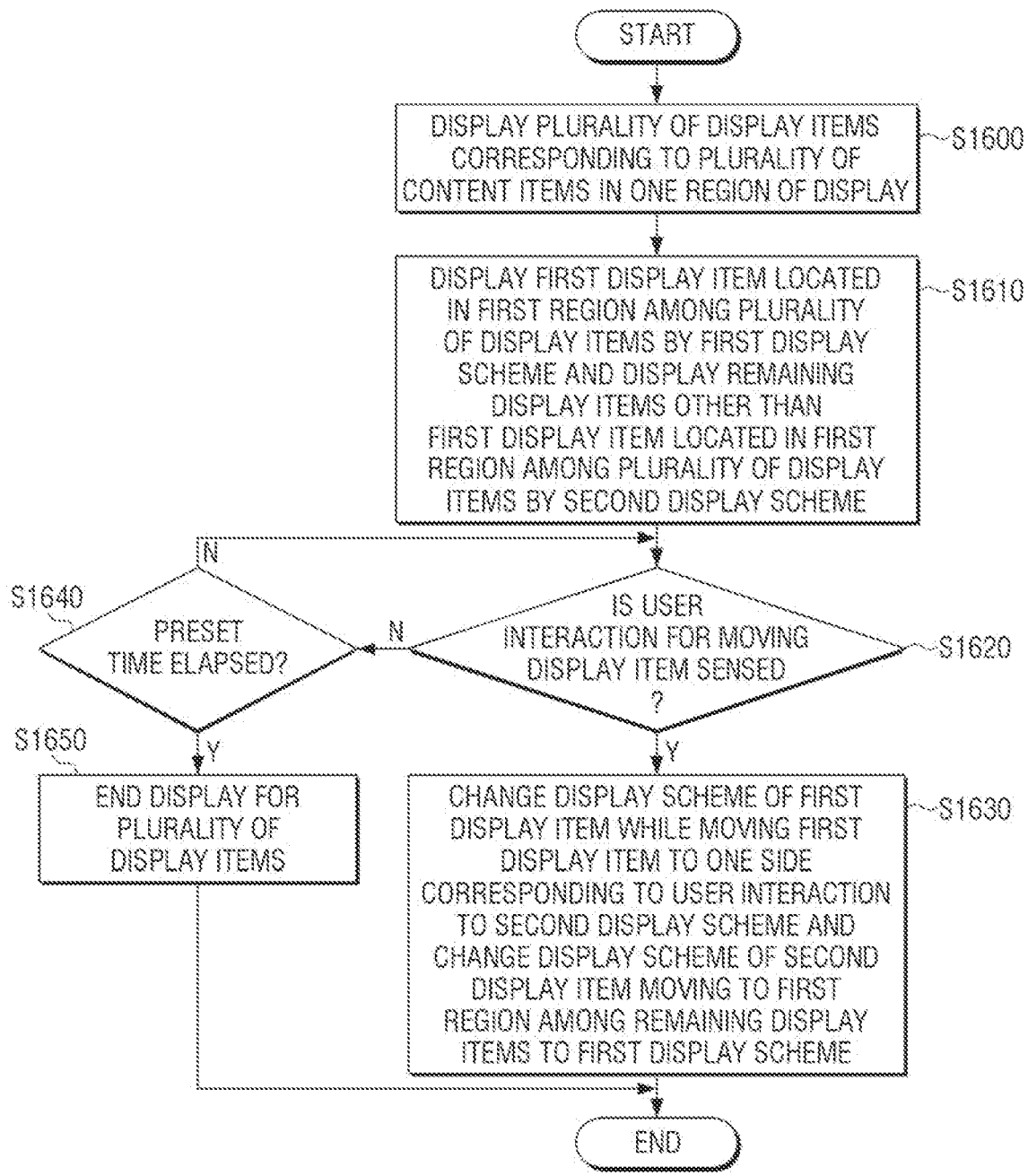
FIG. 16 is a flow chart illustrating a method for moving a plurality of display items according to an exemplary embodiment.

Meanwhile, FIG. 16 is a flow chart illustrating a method for moving a plurality of display items, according to an exemplary embodiment.

First, the display apparatus 100 displays the plurality of display items corresponding to the plurality of content items in one region of the display (S1600). Further, the display apparatus 100 displays the first display item located in the first region among the plurality of display items using the first display scheme and displays the remaining display items other than the first display items located in the first region among the plurality of display items using the second display scheme (S1610).

In detail, the first display scheme may be a scheme for displaying a thumbnail image corresponding to the first display item and the second display scheme may be a scheme for displaying the remaining display items in a block form having a width narrower than that of the thumbnail image. In particular, the second display scheme may be a block form having a color corresponding to an average value of pixel values included in the thumbnail images corresponding to each of the second display items.

The display apparatus 100 determines whether the user interaction for moving a display item is sensed (S1620). Further, when the control apparatus 200 for controlling the display apparatus 100 includes a touch pad, the user interaction may be moving the touched point on the touch pad from the first point to the second point. Alternatively, when the control apparatus 200 includes 4-way buttons, the user interaction may be pressing one of the 4-way buttons. Further, when the control apparatus 200 is a pointing remote controller, the user interaction may also be inclining the pointing remote controller in one direction. When the user interaction for moving the display item is sensed (S1620-Y), the display apparatus 100 changes the display scheme of the first display item to the second display scheme while moving the first display item to one side corresponding to the user interaction and changes the display scheme of the second display item moving to the first region among the remaining display items to the first display scheme (S1630).

In detail, the display apparatus 100, depending on the sensed user interaction, may reduce the width of the first display item in the first direction and increase the width of the second display item moving to the first region in the first direction, thereby changing the display scheme of the second display item to the first display scheme.

Further, when the width of the second display item moving to the first region is larger than that of the first display item reduced in the first direction depending on the user interaction, the display apparatus 100 may perform a control to change the display scheme of the first display item to the second display scheme and change the display scheme of the second display item to the first display scheme.

Meanwhile, when the user interaction for moving the display item is not sensed (S1620-N), the display apparatus 100 determines whether the preset time elapses (S1640). Further, when the preset time (for example, 5 seconds) elapses (S1640-Y), the display apparatus 100 ends the display for the plurality of display items (S1650).

That is, even when the separate user command for ending the display of the display items is not input, the plurality of display items may disappear when the preset time (for example, five seconds) elapses.

Figure 17:
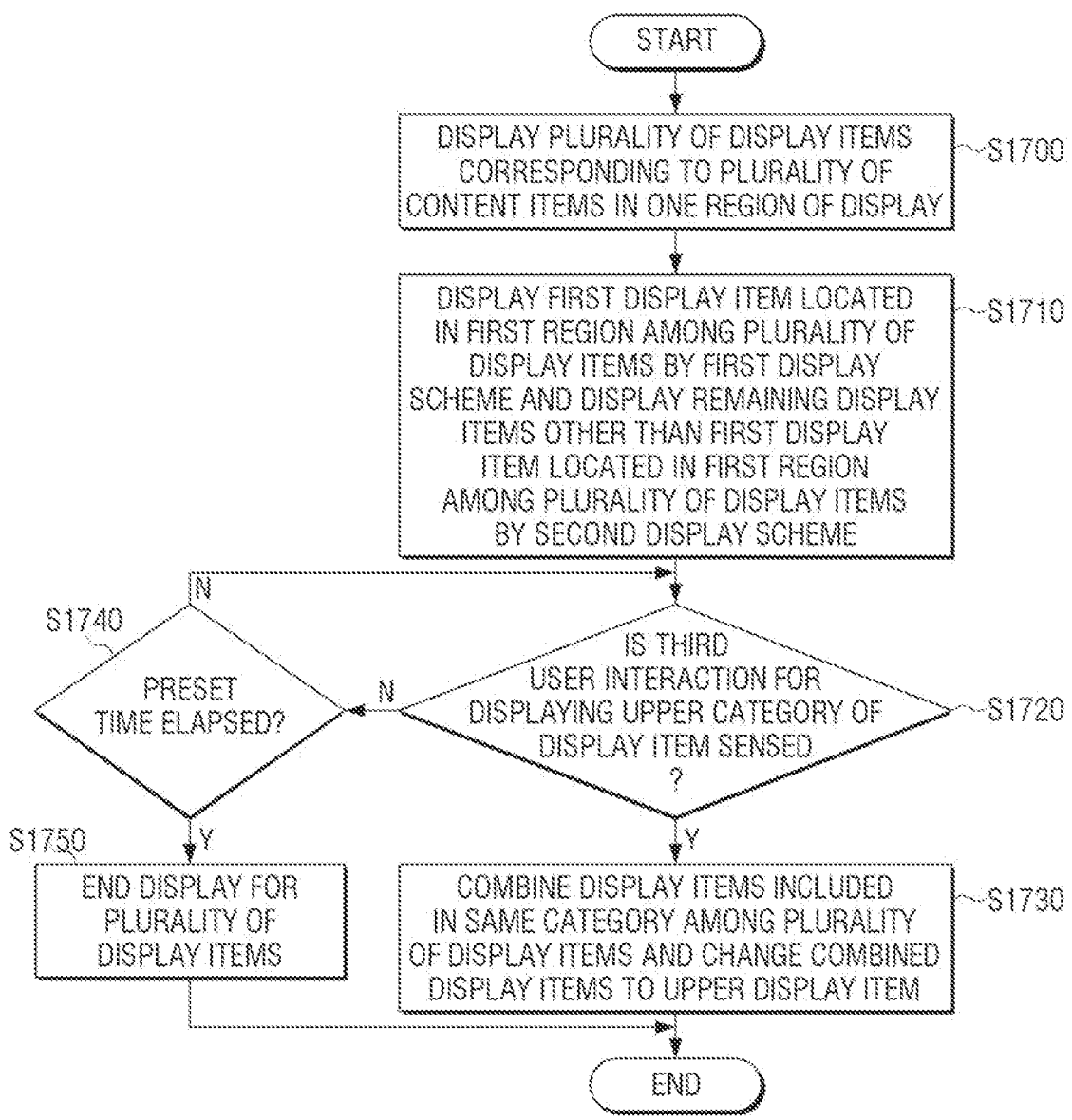
FIG. 17 is a flow chart illustrating a method for controlling a depth of a category corresponding to a plurality of display items according to an exemplary embodiment.

Meanwhile, FIG. 17 is a flow chart illustrating a method for controlling a depth of a category corresponding to a plurality of display items, according to an exemplary embodiment.

First, the display apparatus 100 displays the plurality of display items corresponding to the plurality of content items in one region of the display (S1700). Further, the display apparatus 100 displays the first display item located in the first region among the plurality of display items using the first display scheme, and displays the remaining display items other than the first display items located in the first region among the plurality of display items using the second display scheme (S1710).

In detail, the first display scheme may be a scheme for displaying a thumbnail image corresponding to the first display item, and the second display scheme may be a scheme for displaying the remaining display items in a block form having a width narrower than that of the thumbnail image. In particular, the second display scheme may be a block form having a color corresponding to an average value of pixel values included in the thumbnail images corresponding to each of the second display items.

When the third user interaction for displaying the upper category of the display item is sensed (S1720-Y), the display apparatus 100 combines the display items included in the same category among the plurality of display items and changes the combined display items to the upper display item (S1730).

When the control apparatus 200 includes touch pad 210, the third user interaction may be the user command of dragging on the touch pad 210 in one direction. When the control apparatus 200 includes 4-way buttons 220, the third user interaction may be the pressing one button of the 4-way buttons 220. When the control apparatus 200 is the pointing remote controller, the third user interaction may also be inclining the pointing remote controller in one direction.

The upper display item may be a box form having a color corresponding to an average value of pixel values of the display items prior to being combined.

Further, the display apparatus 100 may display that the upper display item including the vertical line, and subsequently, the vertical line disappears as the display items included in the same category are combined with each other and then are changed to the upper display item.

That is, the display apparatus 100 may display a graphical user interface (GUI) which continuously and naturally combines the plurality of display items as the upper display item.

Meanwhile, when the third user interaction for displaying the upper category of the display item is not sensed (S1720-N), the display apparatus 100 determines whether the preset time elapses (S1740). Further, when the preset time (for example, 5 seconds) elapses (S1740-Y), the display apparatus 100 ends the display for the plurality of display items (S1750).

Meanwhile, program code for performing a control method according to various exemplary embodiments as described above may be stored in a non-transitory computer readable medium. The non-transitory computer readable medium is a medium that semi-permanently stores data therein and is readable by a device. In detail, various applications or programs described above may be stored and provided in the non-transitory computer readable medium, such as a compact disk (CD), a digital versatile disk (DVD), a hard disk, a Blu-ray disk, a universal serial bus (USB), a memory card, a read only memory (ROM), or the like.

According to the display method of the display apparatus as described above, it is possible for the user to easily and simply use the user interface which may freely move between content items or categories classifying the content items.

Although exemplary embodiments have been illustrated and described above, the present disclosure is not limited to the above-mentioned specific exemplary embodiments, but may be variously modified by those skilled in the art without departing from the scope and spirit as disclosed in the accompanying claims. These modifications should also be understood to fall within the scope of the present disclosure.

What is claimed is:

1. A display apparatus, comprising:
   a display unit;
   a sensor configured to sense a user interaction; and
   a controller configured to:
   provide a user interface including a content image displaying region and a representative image displaying region below the content image displaying region,
   in the representative image displaying region, display a representative image item representing a content in a first display scheme, wherein the representative image item displayed in the first display scheme with a first aspect ratio, based on a user input for moving the representative image item, moving the representative image item within the representative image displaying region while maintaining the first display scheme, based on the representative image item being moved to a central area of the representative image displaying region, display the representative image item in a second display scheme, wherein the representative image item displayed in the second display scheme with a second aspect ratio, and while the representative image item is displayed in the first display scheme, display a first representative image of the content on the representative image item, and while the representative image item is displayed in the second display scheme, display a second representative image of the content on the representative image item.

2. The display apparatus as claimed in claim 1, wherein the controller is configured to:

based on a user input for selecting the representative image item being received while the representative image item is displayed in the second display scheme, display the representative image item in a third display scheme.

3. The display apparatus as claimed in claim 2, wherein the controller is configured to:

based on a user input for moving the representative image item from the central area to an area of the representative image displaying region being received while the representative image item is displayed in the third display scheme, move the representative image item while maintaining the third display scheme for the representative image item.

4. The display apparatus as claimed in claim 3, wherein the controller is configured to:

based on the representative image item continuing to be moved to a predetermined position by a user input for moving a display item, change display scheme applied to the representative image item.

5. The display apparatus as claimed in claim 3, wherein the controller is configured to:

based on the representative image item continuing to be moved to a predetermined position by the user input for moving the representative image item, change display scheme applied to the representative image item from the third display scheme to the second display scheme.

6. The display apparatus as claimed in claim 1, wherein the controller is configured to, while the representative image item is moving to the central area, change a representative image displayed in the representative image item from the first representative image to the second representative image.

7. The display apparatus as claimed in claim 1, wherein one of a plurality of image frames belonging to content corresponding to the representative image item is used as a representative image in order to display the representative image item as the second display scheme.

8. The display apparatus as claimed in claim 1, wherein the controller is configured to:

based on the user input being interrupted while the representative image item is moved maintaining a third display scheme, elastically move the representative image item to the central area.

9. The display apparatus as claimed in claim 1, wherein the representative image item in the first display scheme is displayed with the first aspect ratio in which a height of the representative image item is larger than a width of the representative image item, and wherein the representative image item in the second display scheme is displayed with the second aspect ratio in which the height of the representative image item is smaller than the width of the representative image item.

10. The display apparatus as claimed in claim 1, wherein a width of the representative image item displayed in a third display scheme is wider than a width of the representative image item displayed in the second display scheme.

11. A display method of a display apparatus, comprising:

providing a user interface including a content image displaying region and a representative image displaying region below the content image displaying region, in the representative image displaying region, displaying a representative image item representing a content in a first display scheme, wherein the representative image item displayed in the first display scheme with a first aspect ratio, receiving a user input for moving the representative image item;

based on the user input for moving the representative image item, moving the representative image item within the representative image displaying region while maintaining the first display scheme, and based on the representative image item being moved to a central area of the representative image displaying region, displaying the representative image item in a second display scheme, wherein the representative image item displayed in the second display scheme with a second aspect ratio, wherein while the representative image item is displayed in the first display scheme, a first representative image of the content is displayed on the representative image item, and while the representative image item is displayed in the second display scheme, a second representative image of the content is displayed on the representative image item.

12. The display method as claimed in claim 11, further comprising:

based on a user input for selecting the representative image item being received while the representative image item is displayed in the second display scheme, displaying the representative image item in a third display scheme.

13. The display method as claimed in claim 12, further comprising:

based on a user input for moving the representative image item from the central area to an area of the representative image displaying region being received while the representative image item is displayed in the third display scheme, moving the representative image item while maintaining the third display scheme for the representative image item.

14. The display method as claimed in claim 11, further comprising:

based on the representative image item continuing to be moved to a predetermined position by a user input for moving the display item, changing display scheme applied to the representative image item.

15. The display method as claimed in claim 11, further comprising:

based on the representative image item continuing to be moved to a predetermined position by a user input for moving the representative image item, changing display scheme applied to the representative image item from a third display scheme to the second display scheme.

16. The display method as claimed in claim 11, wherein while the representative image item is moving to the central area, a representative image displayed in the representative image item is changed from the first representative image to the second representative image.

17. The display method as claimed in claim 11, wherein one of a plurality of image frames belonging to content corresponding to the representative image item is used as a representative image in order to display the representative image item as the second display scheme.

18. The display method as claimed in claim 11, further comprising:
    based on a user input being interrupted while the representative image item is moved maintaining a third display scheme, elastically moving the representative image item to the central area.

19. The display method as claimed in claim 11,
    wherein the representative image item in the first display scheme is displayed with the first aspect ratio in which a height of the representative image item is larger than a width of the representative image item, and
    wherein the representative image item in the second display scheme is displayed with the second aspect ratio in which the height of the representative image item is smaller than the width of the representative image item.

20. The display method as claimed in claim 11,
    wherein a width of the representative image item displayed in a third display scheme is wider than a width of the representative image item displayed in the second display scheme.

21. A non-transitory computer-readable recording medium having recorded thereon instructions executable by at least one processor to perform operations comprising:
    providing a user interface including a content image displaying region and a representative image displaying region below the content image displaying region,
    in the representative image displaying region, displaying a representative image item representing a content in a first display scheme, wherein the representative image item displayed in the first display scheme with a first aspect ratio,
    based on a user input for moving the representative image item, moving the representative image item within the representative image displaying region while maintaining the first display scheme, and
    based on the representative image item being moved to a central area of the representative image displaying region, displaying the representative image item in a second display scheme, wherein the representative image item displayed in the second display scheme with a second aspect ratio,
    wherein while the representative image item is displayed in the first display scheme, a first representative image of the content is displayed on the representative image item, and while the representative image item is displayed in the second display scheme, a second representative image of the content is displayed on the representative image item.

22. The non-transitory computer-readable recording medium of claim 21, wherein the instructions are executable by the at least one processor to further perform operations comprising:
    based on a user input for selecting the representative image item being received while the representative image item is displayed in the second display scheme, displaying the representative image item in a third display scheme.

23. The non-transitory computer-readable recording medium of claim 22, wherein the instructions are executable by the at least one processor to further perform operations comprising:
    based on a user input for moving the representative image item from the central area to an area of the representative image displaying region being received while the representative image item is displayed in the third display scheme, moving the representative image item while maintaining the third display scheme for the representative image item.

* * * * *